(12) United States Patent
Choi et al.

(10) Patent No.: US 12,647,556 B2
(45) Date of Patent: *Jun. 2, 2026

(54) INTRA PREDICTION METHOD AND APPARATUS BASED ON MULTI-REFERENCE LINE IN IMAGE CODING SYSTEM

(71) Applicant: LG Electronics Inc., Seoul (KR)

(72) Inventors: Jangwon Choi, Seoul (KR); Jaehyun Lim, Seoul (KR); Jin Heo, Seoul (KR); Ling Li, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/918,823

(22) Filed: Oct. 17, 2024

(65) Prior Publication Data

US 2025/0039366 A1     Jan. 30, 2025

Related U.S. Application Data

(63) Continuation of application No. 17/438,567, filed as application No. PCT/KR2019/015502 on Nov. 14, 2019, now Pat. No. 12,149,679.

(60) Provisional application No. 62/822,067, filed on Mar. 22, 2019.

(51) Int. Cl.
| | |
|---|---|
| *H04N 19/105* | (2014.01) |
| *H04N 19/132* | (2014.01) |
| *H04N 19/167* | (2014.01) |
| *H04N 19/176* | (2014.01) |
| *H04N 19/593* | (2014.01) |

(52) U.S. Cl.
CPC ......... *H04N 19/105* (2014.11); *H04N 19/132* (2014.11); *H04N 19/167* (2014.11); *H04N 19/176* (2014.11); *H04N 19/593* (2014.11)

(58) Field of Classification Search
CPC .. H04N 19/176; H04N 19/105; H04N 19/593; H04N 19/11; H04N 19/70; H04N 19/159; H04N 19/186; H04N 19/96; H04N 19/52; H04N 19/157; H04N 19/82; H04N 19/117; H04N 19/59; H04N 19/109; H04N 19/107
USPC .............................................. 375/240–240.29
See application file for complete search history.

(56) References Cited

U.S. PATENT DOCUMENTS

| | | | |
|---|---|---|---|
| 11,019,360 B2 * | 5/2021 | Ramasubramonian | ...................... H04N 19/593 |
| 2018/0332284 A1 * | 11/2018 | Liu | ........................ H04N 19/96 |
| 2022/0007052 A1 * | 1/2022 | Filippov | .............. H04N 19/593 |

* cited by examiner

*Primary Examiner* — Nathnael Aynalem
(74) *Attorney, Agent, or Firm* — Fish & Richardson P.C.

(57) ABSTRACT

An image decoding method performed by a decoding device according to the present document comprises the steps of: obtaining reference line index information and prediction information for a current block; determining an intra prediction mode of the current block on the basis of the prediction information; deriving a reference sample of the current block on the basis of the intra prediction mode and the reference line index information; and generating a prediction sample of the current block on the basis of the reference sample, wherein the intra prediction mode includes a non-directional intra prediction mode, and the reference sample is derived from among surrounding samples of the current block on the basis of the non-directional intra prediction mode and the reference line index information.

6 Claims, 20 Drawing Sheets

X : The reference sample for calculating DC value

: The reference sample for calculating DC value

Reference line 3
Reference line 2
Reference line 1
Reference line 0

Reference line 3
Reference line 2
Reference line 1
Reference line 0

Reference line 3
Reference line 2
Reference line 1
Reference line 0

Reference line 3
Reference line 2
Reference line 1
Reference line 0

Reference line 3
Reference line 2
Reference line 1
Reference line 0

Reference line 3
Reference line 2
Reference line 1
Reference line 0

------- : Interpolation  --------- : Replication

Reference line 3
Reference line 2
Reference line 1
Reference line 0

Reference line 3
Reference line 2
Reference line 1
Reference line 0

Reference line 3
Reference line 2
Reference line 1
Reference line 0

INTRA PREDICTION METHOD AND APPARATUS BASED ON MULTI-REFERENCE LINE IN IMAGE CODING SYSTEM

CROSS-REFERENCE TO RELATED APPLICATIONS

This application is a continuation of U.S. application Ser. No. 17/438,567, filed on Sep. 13, 2021, which is a National Stage application under 35 U.S.C. § 371 of International Application No. PCT/KR2019/015502, filed on Nov. 14, 2019, which claims the benefit of U.S. Provisional Application No. 62/822,067, filed on Mar. 22, 2019. The disclosures of the prior applications are incorporated by reference in their entirety.

BACKGROUND OF DISCLOSURE

Field of the Disclosure

This document relates generally to an image coding technology and, more particularly, to an image decoding method using CCLM prediction in an image coding system, and an apparatus therefor.

Related Art

Demands for high-resolution and high-quality images, such as High Definition (HD) images and Ultra High Definition (UHD) images, have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

This document is to provide a method and an apparatus for increasing image coding efficiency.

This document is also to provide an efficient intra prediction method and apparatus.

This document is also to provide a method and apparatus for intra prediction based on a multi-reference line (MRL).

This document is also to provide a method and apparatus for intra prediction based on multiple reference lines (MRL) when the intra prediction mode is a DC mode and a planar mode.

According to an embodiment of this document, an image decoding method performed by a decoding apparatus is provided. The method includes obtaining reference line index information and prediction information for a current block, determining an intra prediction mode of the current block based on the prediction information, deriving a reference sample of the current block based on the intra prediction mode and the reference line index, and generating a prediction sample of the current block based on the reference sample, wherein the intra prediction mode includes a non-directional intra prediction mode, and wherein the reference sample is derived from among neighboring samples of the current block based on the non-directional intra prediction mode and the reference line index information.

According to another embodiment of this document, a decoding apparatus for performing image decoding is provided. The decoding apparatus includes an entropy decoder configured to obtain reference line index information and prediction information for a current block, a predictor configured to determine an intra prediction mode of the current block based on the prediction information, to derive a reference sample of the current block based on the intra prediction mode and the reference line index, and to generate a prediction sample of the current block based on the reference sample, wherein the intra prediction mode includes a non-directional intra prediction mode, and wherein the reference sample is derived from among neighboring samples of the current block based on the non-directional intra prediction mode and the reference line index information.

According to still another embodiment of this document, a video encoding method which is performed by an encoding apparatus is provided. The method includes deriving reference line index information and intra prediction mode for a current block, deriving a reference sample of the current block based on the reference line index information and the intra prediction mode, generating a prediction sample of the current block based on the reference sample, and generating a bitstream based on image information including the reference line index information and prediction information about the intra prediction mode, wherein the intra prediction mode includes a non-directional intra prediction mode, and wherein the reference sample is derived from among neighboring samples of the current block based on the non-directional intra prediction mode and the reference line index information.

According to still another embodiment of this document, a video encoding apparatus is provided. The encoding apparatus includes a predictor configured to derive reference line index information and intra prediction mode for a current block, to derive a reference sample of the current block based on the reference line index information and the intra prediction mode, to generate a prediction sample of the current block based on the reference sample, and an entropy encoder configured to generate a bitstream based on image information including the reference line index information and prediction information about the intra prediction mode, wherein the intra prediction mode includes a non-directional intra prediction mode, and wherein the reference sample is derived from among neighboring samples of the current block based on the non-directional intra prediction mode and the reference line index information.

According to still yet another embodiment of this document, a computer-readable storage medium is provided. The computer-readable storage medium includes a bitstream stored therein, which is generated by said encoding method.

According to this document, it is possible to improve image compression efficiency.

According to this document, it is possible to efficiently derive an intra prediction mode while reducing computational complexity.

According to this document, by adding DC mode and/or planar mode to MRL (Multi-Reference Line) intra prediction thereby the number of modes can be matched into the number of modes used in other intra prediction, the MPM (Most Probable Mode) list can be efficiently integrated.

DESCRIPTION OF EMBODIMENTS

Figure 1:
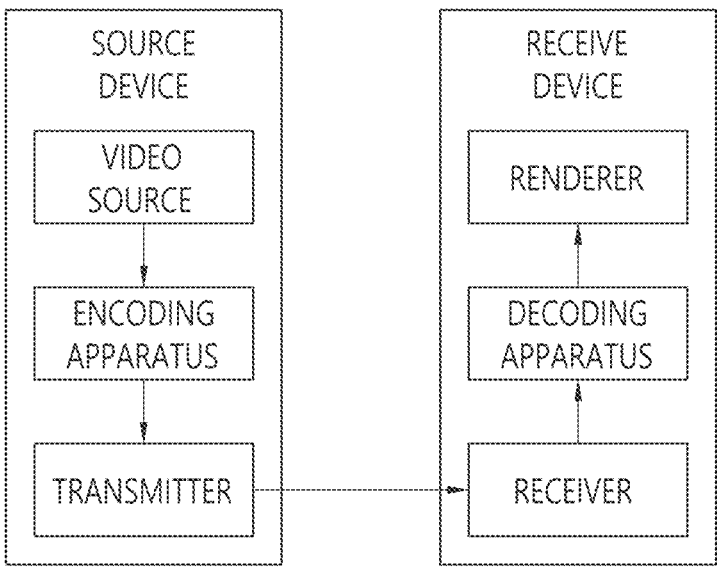
FIG. 1 is schematically illustrating a video/image coding system to which this document may be applied.

This document can be modified in various forms, and specific embodiments thereof will be described and shown in the drawings. However, the embodiments are not intended for limiting this document. The terms used in the following description are used to merely describe specific embodiments, but are not intended to limit this document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each of the components in the drawings described in this document are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this document without departing from the spirit of this document.

Hereinafter, exemplary embodiments of this document will be described in detail with reference to the accompanying drawings. Hereinafter, the same reference numerals are used for the same components in the drawings, and redundant description of the same components may be omitted.

FIG. 1 is schematically illustrating a video/image coding system to which this document may be applied.

Referring to FIG. 1, a video/image coding system may include a first apparatus (a source device) and a second apparatus (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either the number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
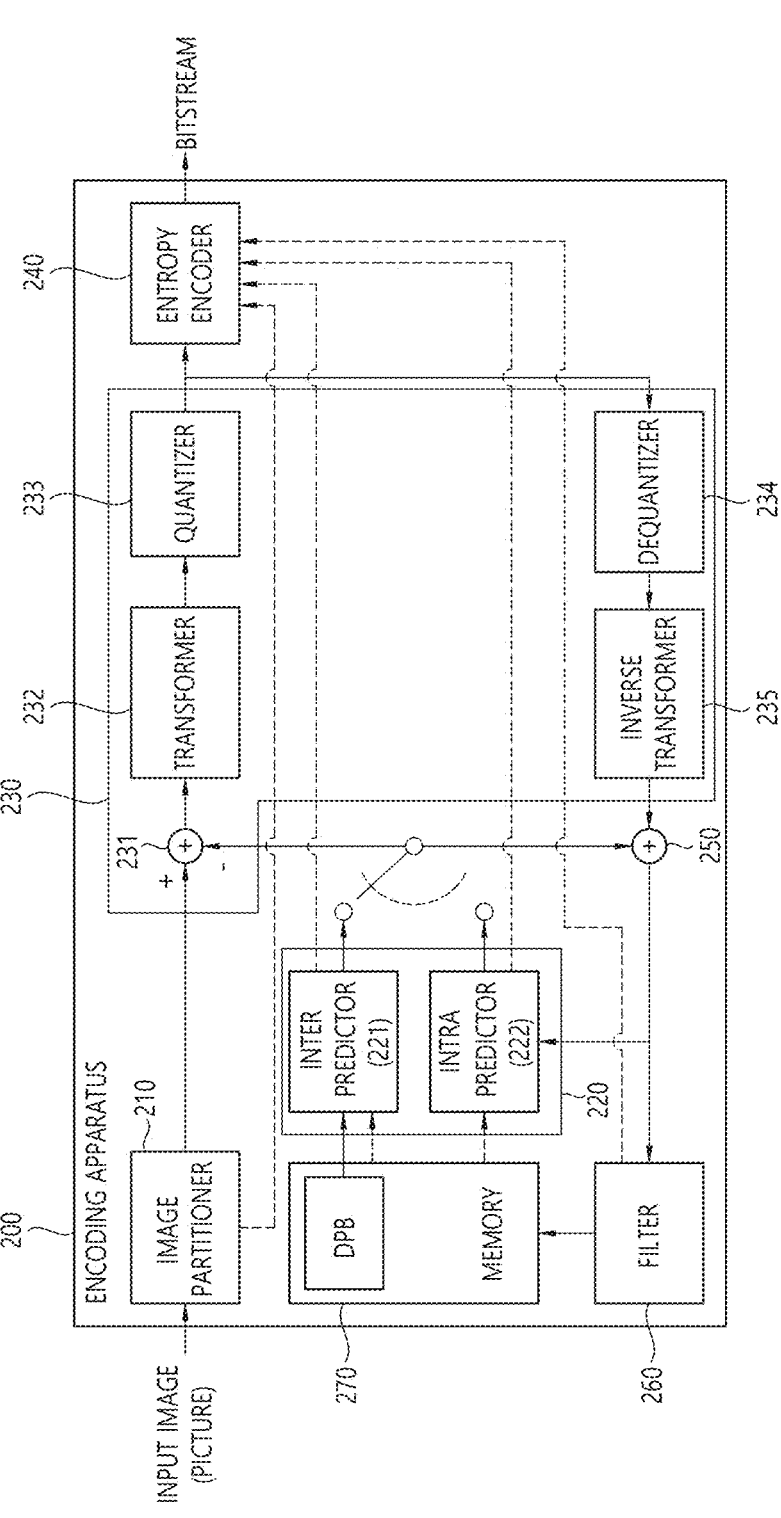
FIG. 2 is a schematic diagram illustrating a configuration of a video/image encoding apparatus to which the present document may be applied.

FIG. 2 is a schematic diagram illustrating a configuration of a video/image encoding apparatus to which the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the embodiments may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
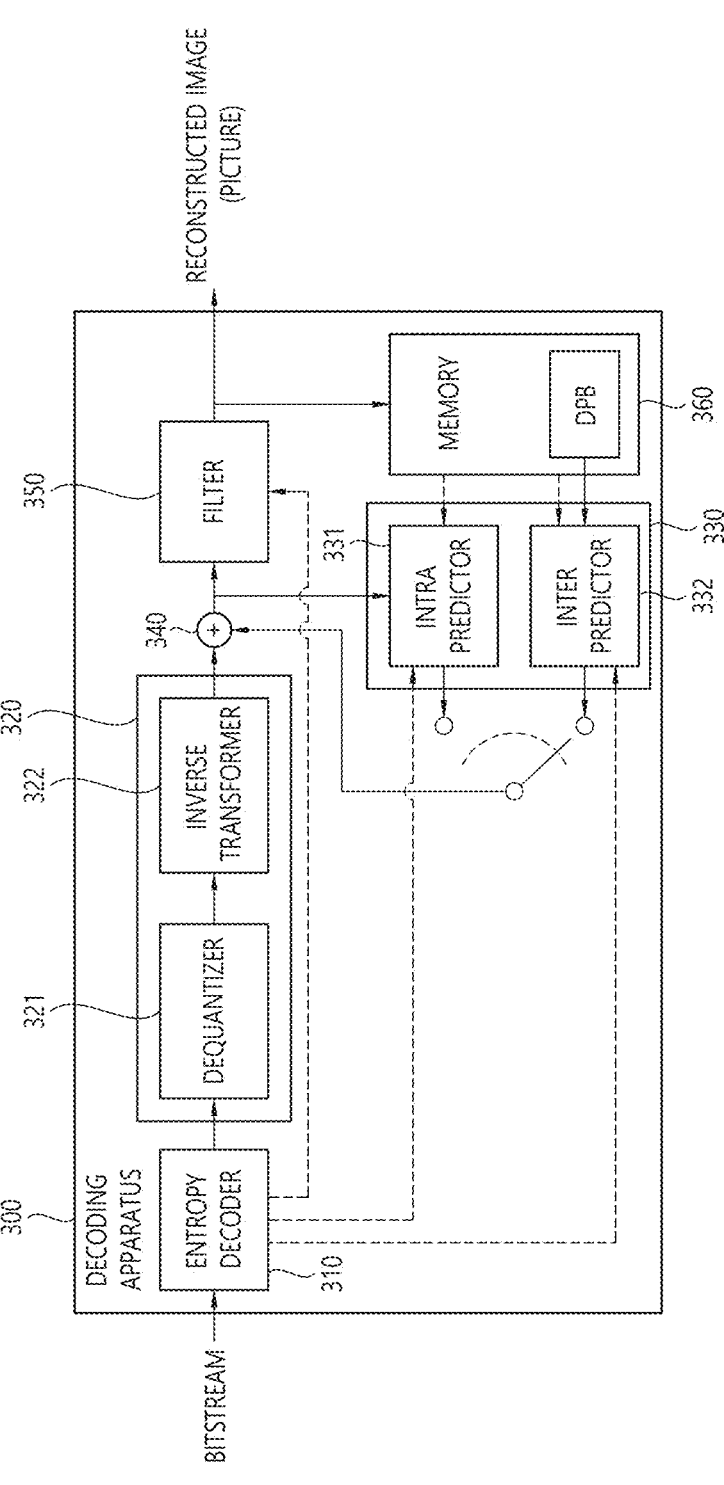
FIG. 3 is a schematic diagram illustrating a configuration of a video/image decoding apparatus to which the present document may be applied.

FIG. 3 is a schematic diagram illustrating a configuration of a video/image decoding apparatus to which the present document may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block. The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Intra prediction may represent prediction generating prediction samples for the current block based on reference samples in a picture (hereinafter, current picture) to which the current block belongs. When the intra prediction is applied to the current block, neighboring reference samples to be used for the intra prediction of the current block may be derived. The neighboring reference samples of the current block may include a sample adjacent to a left boundary of the current block having a size of nW×nH, total 2×nH samples neighboring the bottom-left, a sample adjacent to a top boundary of the current block, total 2×nW samples neighboring the top-right, and one sample neighboring the top-left of the current block. Further, the neighboring reference samples of the current block may also include top neighboring samples of a plurality of columns and left neighboring samples of a plurality of rows. Further, the neighboring reference samples of the current block may also include total nH samples adjacent to the right boundary of the current block having the size of nW×nH, total nW samples adjacent to a bottom boundary of the current block, and one sample neighboring the bottom-right of the current block.

However, some of the neighboring reference samples of the current block may have not yet been decoded or may be unavailable. In this case, the decoder may configure the neighboring reference samples to be used for the prediction by substituting available samples for unavailable samples. Further, the decoder may configure the neighboring reference samples to be used for the prediction through interpolation of the available samples.

When the neighboring reference samples are derived, (i) a prediction sample may be induced based on an average or interpolation of the neighboring reference samples of the current block, and (ii) the prediction sample may be induced based on the reference sample existing in a specific (prediction) direction with respect to the prediction sample among the neighboring reference samples of the current block. The case (i) may be called a non-directional mode or a non-angular mode, and the case (ii) may be called a directional mode or an angular mode.

Further, the prediction sample may be generated through interpolation between a first neighboring sample located in a prediction direction of the intra prediction mode of the current block and a second neighboring sample located in an opposite direction to the prediction direction among the neighboring reference samples. The above-described case may be called a linear interpolation intra prediction (LIP). Further, chroma prediction samples may be generated based on luma samples using a linear model. This case may be called an LM mode.

Further, a temporary prediction sample of the current block may be derived based on the filtered neighboring reference samples, and the prediction sample of the current block may be derived by weighted-summing the at least one reference sample derived according to the intra prediction mode among the existing neighboring reference samples, that is, non-filtered neighboring reference samples, and the temporary prediction sample. The above-described case may be called a position dependent intra prediction (PDPC).

Further, a reference sample line having the highest prediction accuracy among neighboring multiple reference sample lines of the current block may be selected, and the prediction sample may be derived from the corresponding line using the reference sample located in the prediction direction. In this case, an intra prediction encoding may be performed as a method for indicating (signaling) the used reference sample line to the decoding apparatus. The above-described case may be called a multi-reference line (MRL) intra prediction or MRL based intra prediction.

Further, the intra prediction may be performed based on the same intra prediction mode by dividing the current block into vertical or horizontal sub-partitions, and the neighboring reference samples may be derived and used in the unit of sub-partition. That is, in this case, the intra prediction mode for the current block is equally applied to the sub-partitions, and the neighboring reference sample is derived and used in the unit of the sub-partition, thereby enhancing the intra prediction performance as needed. Such a prediction method may be called an intra sub-partitions (ISP) or ISP based intra prediction.

The above-described intra prediction methods may be called an intra prediction type separately from the intra prediction mode. The intra prediction type may be called by various wordings, such as intra prediction technique or additional intra prediction mode. For example, the intra prediction type (or additional intra prediction mode and the like) may include at least one of LIP, PDPC, MRL, and ISP described above. A general intra prediction method excluding specific intra prediction type, such as the LIP, PDPC, MRL, and ISP, may be called a normal intra prediction type. The normal intra prediction type may be generally applied in case that the above specific intra prediction type is not applied, and the prediction may be performed based on the above-described intra prediction mode. Meanwhile, post-filtering may be performed on the derived prediction sample as needed.

Specifically, the intra prediction procedure may include an intra prediction mode/type determination step, a neighboring reference sample derivation step, and an intra prediction mode/type based prediction sample derivation step. In addition, a post-filtering step may be performed on the derived prediction sample as needed.

In case that intra prediction is applied, the intra prediction mode that is applied to the current block may be determined using the intra prediction mode of a neighboring block. For example, the decoding apparatus may select one of MPM candidates in the most probable mode (MPM) list, which is derived based on the intra prediction mode of the neighboring blocks (e.g., left and/or top neighboring blocks) of the current block and additional candidate modes, based on the received MPM index, or may select one of the remaining intra prediction modes that are not included in the MPM candidates (and planar mode) based on the remaining intra prediction mode information. The MPM list may be configured to include or not to include the planar mode as the candidate. For example, if the MPM list includes the planar mode as the candidate, the MPM list may have 6 candidates, whereas if the MPM list does not include the planar mode as the candidate, the MPM list may have 5 candidates. If the MPM list does not include the planar mode as the candidate, a not planar flag (e.g., intra_luma_not_planar_flag) indicating whether the intra prediction mode of the current block is not the planar mode may be signaled. For example, the MPM flag may be first signaled, and the MPM index and the not planar flag may be signaled in case that a value of the MPM flag is 1. Further, the MPM index may be signaled in case that a value of the not planar flag is 1. Here, the reason that the MPM list is configured not to include the planar mode as the candidate is to first check the planar mode by first signaling the flag (not planar flag) since the planar mode is always considered as the MPM rather than that the planar mode is not the MPM.

For example, whether the intra prediction mode being applied to the current block is in the MPM candidates (and planar mode) or in the remaining mode may be indicated based on the MPM flag (e.g., intra_luma_mpm_flag). The MPM flag value 1 may represent that the intra prediction mode for the current block is in the MPM candidates (and planar mode), and the MPM flag value 0 may represent that that the intra prediction mode for the current block is not in the MPM candidates (and planar mode). The not planar flag (e.g., intra_luma_not_planar_flag) value 0 may represent that the intra prediction mode for the current block is the planar mode, and the not planar flag value 1 may represent that the intra prediction mode for the current block is not the planar mode. The MPM index may be signaled in the form of mpm_idx or intra_luma_mpm_idx syntax element, and the remaining intra prediction mode information may be signaled in the form of rem_intra_luma_pred_mode or intra_luma_mpm_remainder syntax element. For example, the remaining intra prediction mode information may indicate one of the remaining intra prediction modes which are not included in the MPM candidates (and planar mode) among all the intra prediction modes by indexing the remaining intra prediction modes in the order of prediction mode numbers. The intra prediction mode may be an intra prediction mode for a luma component (sample). Hereinafter, the intra prediction mode information may include at least one of the MPM flag (e.g., intra_luma_mpm_flag), the not planar flag (e.g., intra_luma_not_planar_flag), the MPM index (e.g., mpm_idx or intra_luma_mpm_idx), or the remaining intra prediction mode information (rem_intra_luma_pred_mode or intra_luma_mpm_remainder). In the document, the MPM list may be called as various wordings, such as MPM candidate list, candModeList, and the like. If the MIP is applied to the current block, separate mpm flag (e.g., intra_mip_mpm_flag), mpm index (e.g., intra_mip_mpm_idx), and remaining intra prediction mode information (e.g., intra_mip_mpm_remainder) may be signaled for the MIP, and the not planar flag is not signaled.

In other words, if block partition for an image is generally performed, the current block to be coded and the neighboring block have similar image characteristics. Accordingly, there is a high probability that the current block and the neighboring block have the same or similar intra prediction mode. Accordingly, the encoder may use the intra prediction mode of the neighboring block in order to encode the intra prediction mode of the current block.

For example, the encoder/decoder may configure the most probable mode (MPM) list for the current block. The MPM list may be represented as the MPM candidate list. Here, the term MPM may mean a mode that is used to improve the coding efficiency in consideration of similarity between the current block and the neighboring block during the intra prediction mode coding. As described above, the MPM list may be configured to include the planar mode, or may be configured to exclude the planar mode. For example, if the MPM list includes the planar mode, the number of candidates of the MPM list may be 6. Further, if the MPM list does not include the planar mode, the number of candidates of the MPM list may be 5.

The encoder/decoder may configure the MPM list including 6 MPMs.

In order to configure the MPM list, three kinds of modes of default intra modes, neighbor intra modes, and derived intra modes may be considered.

For the neighbor intra modes, two neighboring blocks, that is, a left neighboring block and a top neighboring block, may be considered.

As described above, if the MPM list is configured not to include the planar mode, the planar mode is excluded from the list, and the number of candidates of the MPM list may be set to 5.

Figure 4:
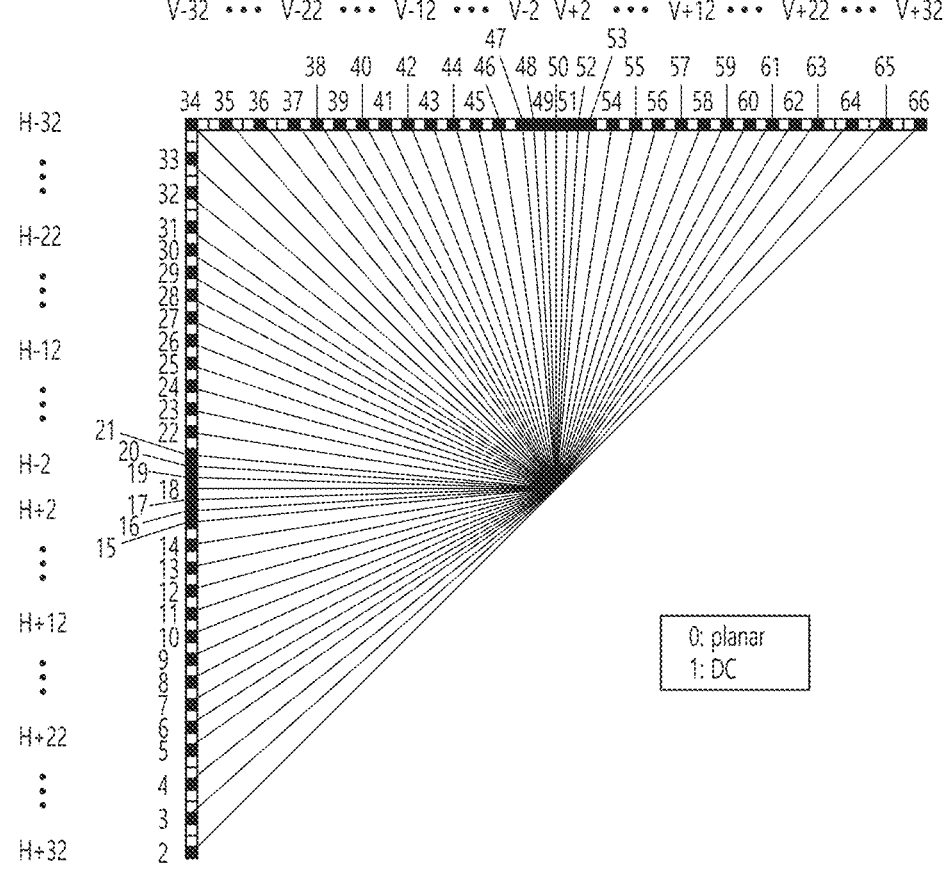
FIG. 4 illustrates an example of 67 intra prediction modes.

FIG. 4 illustrates an example of 67 intra prediction modes.

Referring to FIG. 4, among intra prediction modes, a directional mode or an angular mode may discriminate an intra prediction mode having horizontal directionality and an intra prediction mode having vertical directionality from each other around No. 34 intra prediction mode having top-left diagonal prediction direction. In FIG. 4, H and V mean the horizontal directionality and the vertical directionality, respectively, and numerals of −32 to 32 represent displacements in the unit of 1/32 on a sample grid position. No. 2 to No. 33 intra prediction modes have the horizontal directionality, and No. 34 to No. 66 intra prediction modes have the vertical directionality. No. 18 intra prediction mode and No. 50 intra prediction mode represent a horizontal intra prediction mode and a vertical intra prediction mode, respectively. No. 2 intra prediction mode may be called a bottom-left diagonal intra prediction mode, No. 34 intra prediction mode may be called a top-left diagonal intra prediction mode, and No. 66 intra prediction mode may be called a top-right diagonal intra prediction mode.

Further, the non-directional mode or the non-angular mode among the intra prediction modes may include a DC mode based on the average of the neighboring reference samples of the current block or an interpolation based planar mode.

Figure 5:
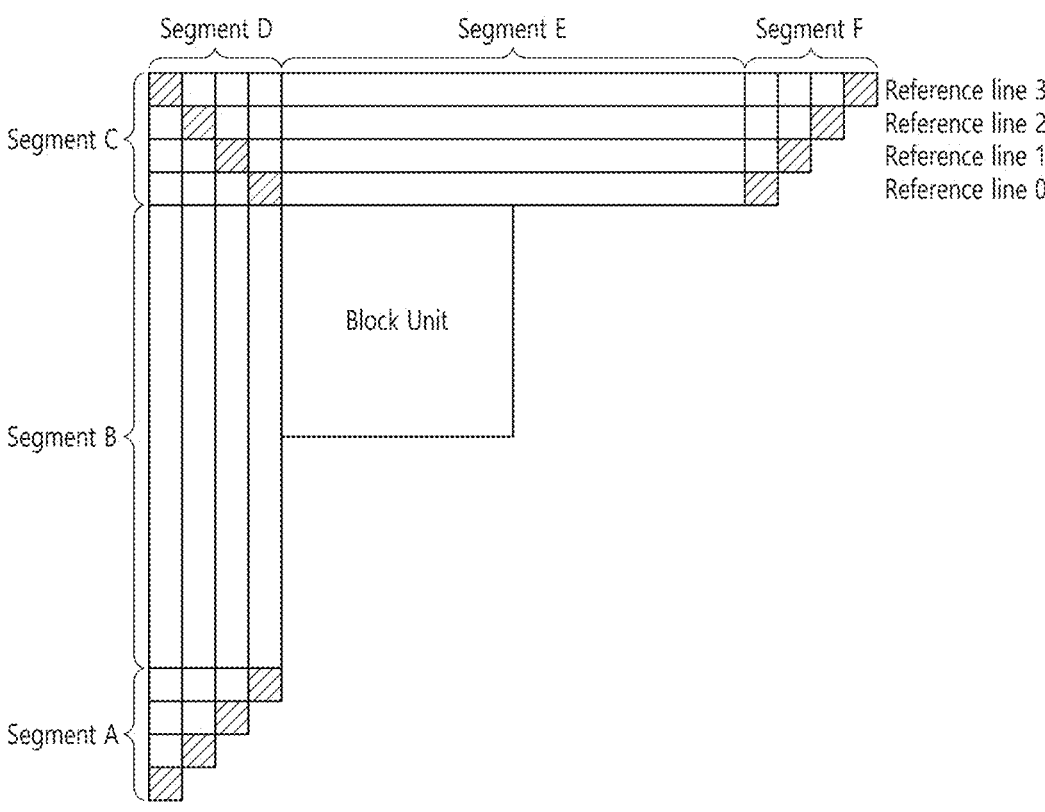
FIG. 5 shows an example of a reference sample line for MRL intra prediction.

FIG. 5 shows an example of a reference sample line for MRL intra prediction.

In the conventional intra prediction, direct neighboring samples, that is, directly adjacent neighboring samples, are used as reference samples for prediction. Multi-reference line intra prediction (MRL) is a method of using neighboring samples located at a distance of 1 or 3 samples from the left and top sides of the current prediction block, and improves the accuracy of prediction by extending the reference sample selection range compared to the conventional intra prediction.

That is, the positions of neighboring samples used in the conventional intra prediction may be neighboring samples located at a 0 sample distance from the current prediction block, and the positions of these neighboring samples may be referred to as a reference line 0, and the positions of the reference samples extended according to the MRL may be about neighboring samples located at a distance of 1 or 3 samples from the current prediction block, and positions of these neighboring samples may be referred to as reference line 1 or reference line 3, respectively. Here, the reference line may be simply referred to as a line.

Referring to FIG. 5, reference line 0, reference line 1, reference line 2, and reference line 3 may be located in the nearest order from the prediction block, reference line 0 indicates the positions of neighboring samples used in conventional intra prediction, and reference line 1 and reference line 3 may indicate positions of extended neighboring samples for MRL intra prediction.

In addition, in the MRL intra prediction, top reference samples, top-left corner reference samples, and left reference samples of the prediction block for intra prediction are indicated by the multiple reference line index information. That is, the multiple reference line index information may indicate a reference line of neighboring samples to be used for intra prediction of a coding unit. Alternatively, it may indicate which reference line is used for intra prediction with respect to the current block. Here, the multiple reference line index information may be referred to as reference line index information.

The multiple reference line index information may include an mrl_idx field. In this case, information on a reference line of neighboring reference samples to be used for intra prediction among a plurality of reference lines may be obtained based on the mrl_idx field. Alternatively, information on a reference line of neighboring reference samples to be used for intra prediction among a plurality of reference lines may be indicated based on the mrl_idx field. Alternatively, information on a reference line of neighboring reference samples to be used for intra prediction among a plurality of reference lines may be obtained based on the mrl_idx field value. Alternatively, the mrl_idx field value may indicate any one of 0, 1, and 2, so that information on reference lines of neighboring reference samples to be used for intra prediction is obtained through any one of reference line 0, reference line 1, and reference line 3. Here, the reference line 2 is excluded, but the line 2 may also be used according to a setting.

For example, the mrl_idx field may be referred to as an (intra) reference sample line index, and may also be referred to as an intra_luma_ref_idx field or an intra_luma_ref_line_idx field. Alternatively, the multiple reference line index information may be configured in the form of an intra_luma_ref_idx syntax element.

For example, multiple reference line index information may be signaled through a coding unit (CU) syntax. Alternatively, the coding unit syntax may include multiple reference line index information, and the multiple reference line index information may be signaled through the coding unit syntax. Alternatively, the coding unit syntax may be generated in the encoding apparatus and signaled to the decoding apparatus. For example, the coding unit syntax may be included as shown in Table 1 below.

TABLE 1

```
coding_unit( x0, y0, cbWidth, cbHeight, treeType ) {
    if( slice_type != I ) {
        cu_skip_flag[ x0 ][ y0 ]
        if( cu_skip_flag[ x0 ][ y0 ] = = 0 )
            pred_mode_flag
    }
    if( CuPredMode[ x0 ][ y0 ] = = MODE_INTRA ) {
        if( treeType = = SINGLE_TREE | | treeType = =
        DUAL_TREE_LUMA ) {
            if( ( y0 % CtbSizeY ) > 0 )
                intra_luma_ref_idx[ x0 ][ y0 ]
            if (intra_luma_ref_idx[ x0 ][ y0 ] = = 0)
                intra_luma_mpm_flag[ x0 ][ y0 ]
            if( intra_luma_mpm_flag[ x0 ][ y0 ] )
                intra_luma_mpm_idx[ x0 ][ y0 ]
            else
                intra_luma_mpm_remainder[ x0 ][ y0 ]
        }
    . . .
    }
```

Referring to Table 1, the intra_luma_ref_idx [x0][y0] field may indicate a line IntraLumaRefLineIdx [x0][y0] of reference samples. Alternatively, the multiple reference line index information may include the intra_luma_ref_idx [x0] [y0] field, and may indicate information on a reference line of neighboring reference samples to be used for intra prediction. Here, information on a reference line of neighboring reference samples to be used for intra prediction may include an IntraLumaRefLineIdx [x0][y0] field.

For example, a line IntraLumaRefLineIdx [x0][y0] of reference samples indicated according to the intra_luma_ref_idx [x0][y0] field value may be as shown in Table 2 below.

TABLE 2

| intra_luma_ref_idx[ x0 ][ y0 ] | IntraLumaRefLineIdx[ x0 ][ y0 ] |
|---|---|
| 0 | 0 |
| 1 | 1 |
| 2 | 3 |

In other words, as shown in Table 2, when a value of the intra_luma_ref_idx [x0][y0] field is 0, a value of the IntraLumaRefLineIdx [x0][y0] is 0, and this may represent that the 0th reference line (reference line 0) is the reference line of the neighboring reference samples to be used for the intra prediction. When a value for the intra_luma_ref_idx [x0][y0] field is 1, a value of the IntraLumaRefLineIdx [x0][y0] is 1, and this may represent that the 1th reference line (reference line 1) is the reference line of neighboring reference samples to be used for the intra prediction. When a value of the intra_luma_ref_idx [x0][y0] field is 2, a value the IntraLumaRefLineIdx [x0][y0] is 3, and this may represent that the 3th reference line (reference line 3) is the reference line of neighboring reference samples to be used for the intra prediction.

For example, the intra_luma_ref_idx [x0][y0] field may not be included in the coding unit syntax, and in this case, the intra_luma_ref_idx [x0][y0] field value may be the same as 0. Or value 0 may be implied by this case.

For example, the intra_luma_ref_idx [x0][y0] field may not be included in the coding unit syntax, and in this case, the intra_luma_ref_idx [x0][y0] field value may be the same as 1. Or value 1 may be implied by this case.

In addition, the MRL may be disabled for the first row or blocks of the first line in a coding tree unit (CTU). That is, the first row or a block located on the first line in the CTU may not be able to use the MRL. This may be to prevent the use of extended reference samples (extended reference lines) outside the current CTU line. In addition, when the above-described additional reference line is used, the above-described PDPC may be disabled. That is, when MRL intra prediction is used or when reference line 1 or reference line 3 is used in MRL intra prediction, the corresponding block may not be able to use the PDPC.

Conventional intra prediction can perform intra prediction encoding/decoding using 67 intra modes, and multi-reference line intra prediction can use 65 intra prediction modes excluding planar mode and DC mode to perform intra prediction encoding/decoding. In addition, in sub-partition intra prediction, intra prediction encoding/decoding may be performed using 66 intra prediction modes excluding the DC mode. Since these three intra predictions (conventional intra prediction, multi-reference line intra prediction, and sub-partition intra prediction) all use different numbers of intra modes to perform intra prediction/decoding, an MPM list generation method for each prediction may be different each other.

However, in the embodiment, the DC mode and the planar mode can be efficiently applied when multi-reference line intra prediction is performed as described below, and thus the coding efficiency can be improved. In addition, the MPM list described above can be efficiently integrated. That is, since the 67 intra prediction modes can be used by further adding the DC mode and the planar mode to the 65 intra prediction modes, the MPM list can be integrated.

Hereinafter, the cases of using the DC mode in the multi-reference line intra prediction will be described in detail with FIGS. 6 to 13, and the cases of using the planar mode in the multi-reference line intra prediction will be described later in detail with FIGS. 14 to 17. Also, according to an embodiment, the reference sample of the current block may include a neighboring sample of the current block or a reference line sample of the current block, and the reference line sample may represent a sample on the corresponding reference line.

Figure 6:
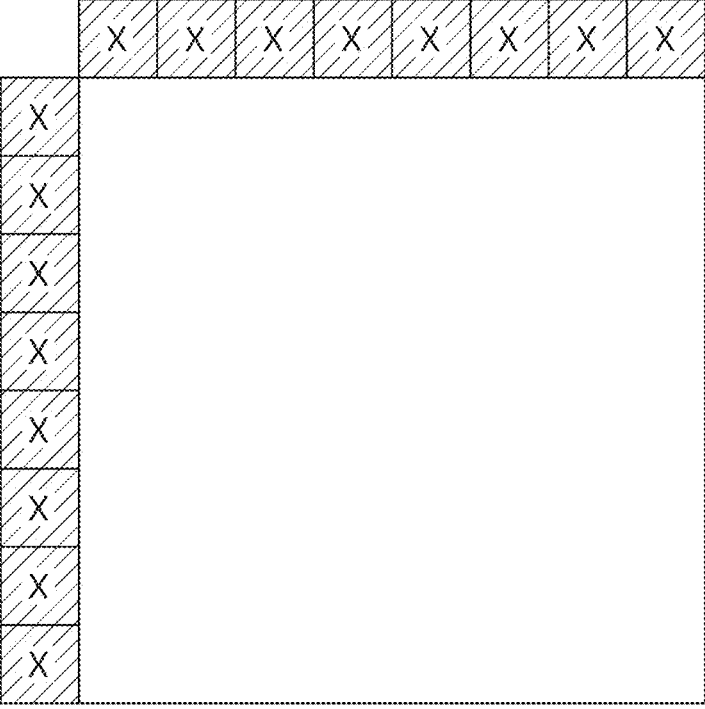
FIG. 6 shows an example of reference samples used in the DC mode when the current block has a square shape.

FIG. 6 shows an example of reference samples used in the DC mode when the current block has a square shape.

Figure 7:
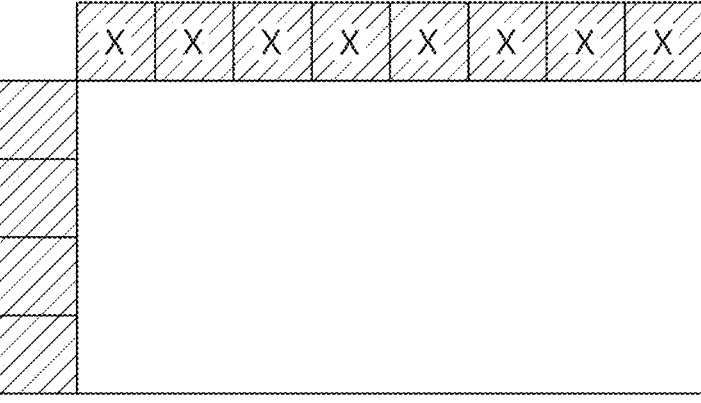
FIG. 7 shows an example of reference samples used in the DC mode when the current block has a rectangular shape.

FIG. 7 shows an example of reference samples used in the DC mode when the current block has a rectangular shape.

First, according to an embodiment, when intra prediction not using multiple reference lines is performed, when multiple reference line index information indicates reference line 0, or when the mrl_idx field has a value of 0, intra prediction based on DC mode may be performed, as shown in FIGS. 6 and 7.

For example, in the embodiment, when the shape of the block is square as shown in FIG. 6, the DC value can be calculated using left and top reference line samples excluding top-left samples of the block. Here, the DC value may represent an average value of reference line samples. Alternatively, it may be derived based on the average value. Also, in an embodiment, when the shape of the block is a rectangle as shown in FIG. 7, the DC value may be calculated using the reference line sample of the longer side (the top side in FIG. 7) among the left side and the top side. Here, the left reference line sample or the top reference line sample may be referred to as left neighboring samples or top neighboring samples adjacent to the current block, and they may also be referred to as samples of the neighboring block adjacent to the left boundary of the current block or samples of the neighboring block adjacent to the top boundary of the current block.

Figure 8:
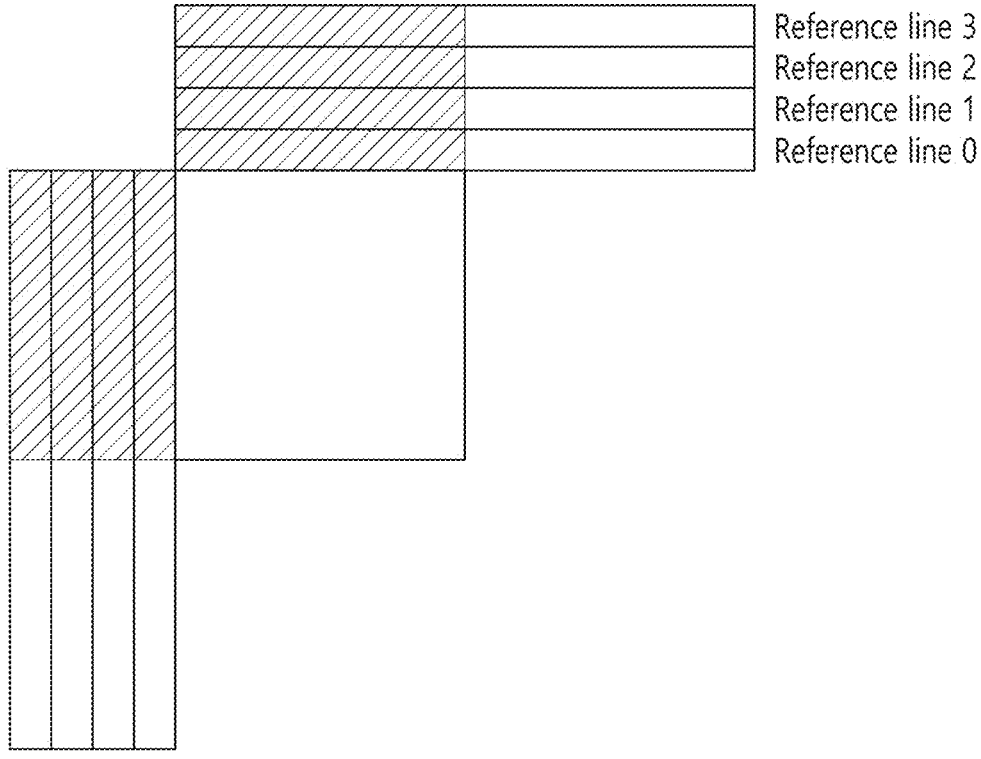
FIG. 8 shows an example of reference samples used for DC mode in MRL intra prediction when the current block has a square shape.

FIG. 8 shows an example of reference samples used for DC mode in MRL intra prediction when the current block has a square shape.

Figure 9:
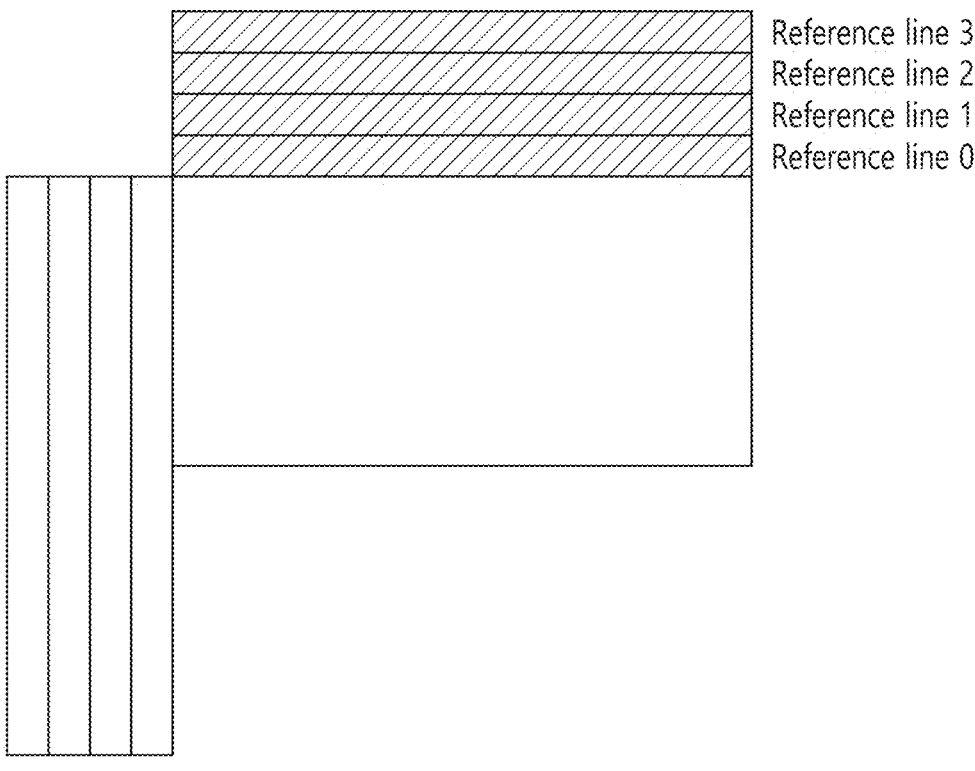
FIG. 9 shows an example of reference samples used for DC mode in MRL intra prediction when the current block has a rectangular shape.

FIG. 9 shows an example of reference samples used for DC mode in MRL intra prediction when the current block has a rectangular shape.

In an embodiment, when multi-reference line intra prediction is performed, when multi-reference line index information indicates reference line 0, 1, 2 or 3, or when the mrl_idx field has a value of 0, 1, 2, or 3, intra prediction based on DC mode may be performed.

For example, the multiple reference line index information may indicate reference lines 0, 1, or 2, and the mrl_idx field may have a value of 0, 1, or 2. That is, when the mrl_idx field has a value of 0, the multi-reference line index information may indicate reference line 0, when the mrl_idx field has a value of 1, the multi-reference line index information may indicate reference line 1, and when the mrl_idx field has a value of 2, the multiple reference line index information may indicate reference line 2. Alternatively, the multiple reference line index information may indicate reference lines 0, 1, or 3, and the mrl_idx field may have a value of 0, 1, or 2. That is, when the mrl_idx field has a value of 0, the multi-reference line index information may indicate reference line 0, when the mrl_idx field has a value of 1, the multi-reference line index information may indicate reference line 1, and when the mrl_idx field has a value of 2, the multiple reference line index information may indicate reference line 3. Alternatively, the multiple reference line index information may indicate reference lines 0, 1, 2, or 3, and the mrl_idx field may have a value of 0, 1, 2, or 3. That is, when the mrl_idx field has a value of 0, the multi-reference line index information may indicate reference line 0, when the mrl_idx field has a value of 1, the multi-reference line index information may indicate reference line 1, when the mrl_idx field has a value of 2, the multi-reference line index information may indicate reference line 2, and when the mrl_idx field has a value of 3, the multi-reference line index information may indicate reference line 3.

The above description of multi-reference line index information or the mrl_idx field may be used in the embodiments described in conjunction with FIGS. 8 to 13.

For example, in the embodiment, when the shape of the block is square as shown in FIG. 8, (DC) intra prediction may be performed using samples located in the reference line area indicated by the multiple reference line index information among the gray area or the shaded area. Alternatively, the DC value may be calculated using samples located in the reference line area indicated by the multiple reference line index information among the gray area or the shaded area. Here, the gray area or the shaded area may include reference line samples on the left side and top side of the current block, and samples located at the top-left side of the current block may be excluded.

For example, in an embodiment, when the block shape is rectangular as shown in FIG. 9, (DC) intra prediction may be performed using samples located in the region of the reference line indicated by the multiple reference line index information among the gray area or the shaded area on the longer side (top side in FIG. 9) among the left side and top side of the block. Alternatively, the DC value may be calculated using samples in the region of the reference line indicated by the multiple reference line index information among the gray region or the shaded region on the longer side among the left side and the top side of the block.

For example, when the size of the current block is W(width)×H(Height), the top-left sample position (0, 0) of the current block is as the reference, and the reference line indicated by the multi-reference line index information is the reference line N, left reference line samples may include samples located from (−N−1, 0) to (−N−1, H−1), and top reference line samples may include samples located from (0, −N−1) to (W−1, −N−1). Here, W and H may each have an integer value, and may be the same as or different from each other. Also, N may be referred to as a reference line value or a reference line index value, and may be 0, 1, 2, or 3.

Figure 10:
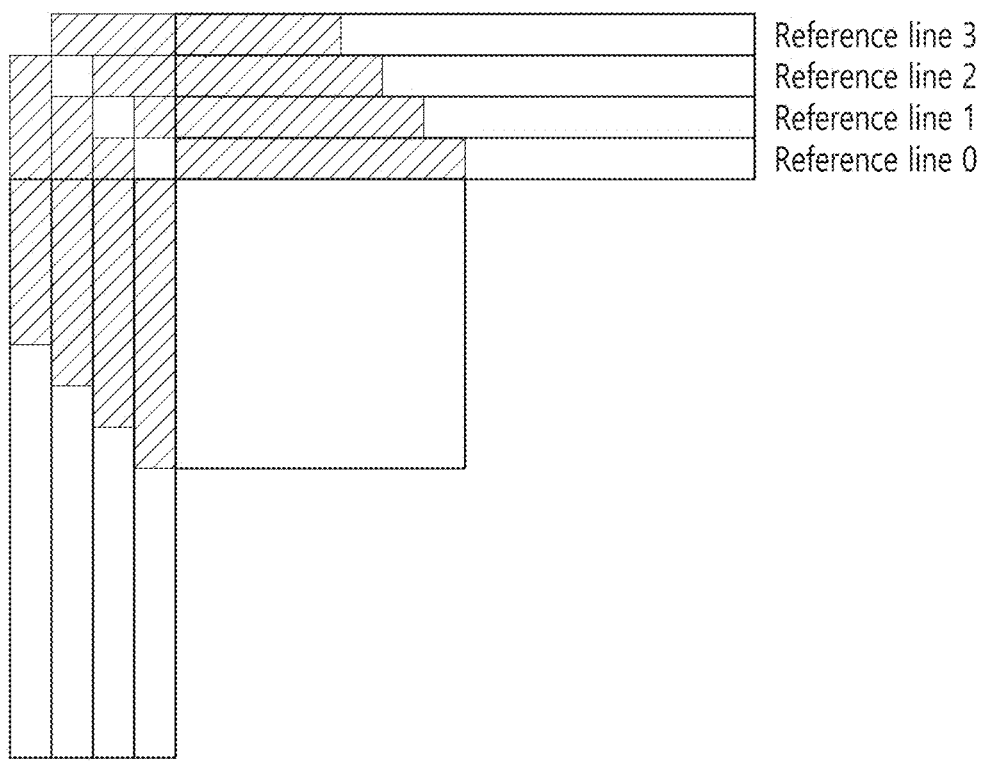
FIG. 10 shows another example of reference samples used for DC mode in MRL intra prediction when the current block has a square shape.

FIG. 10 shows another example of reference samples used for DC mode in MRL intra prediction when the current block has a square shape.

Figure 11:
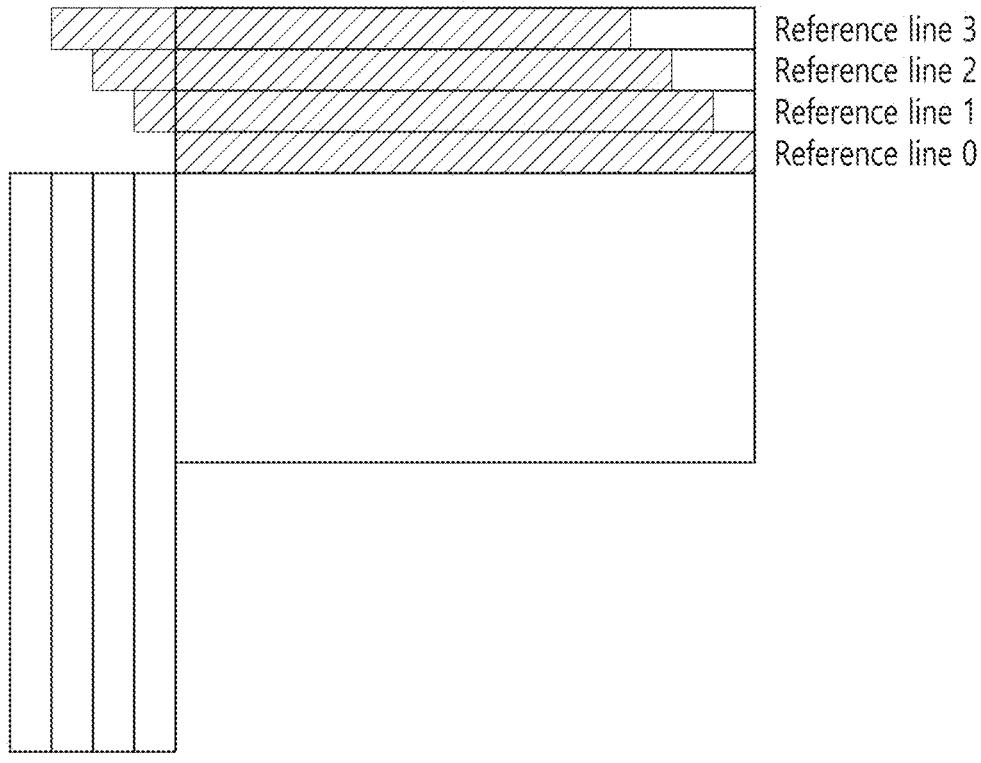
FIG. 11 shows another example of reference samples used for DC mode in MRL intra prediction when the current block has a rectangular shape.

FIG. 11 shows another example of reference samples used for DC mode in MRL intra prediction when the current block has a rectangular shape.

For example, in an embodiment, when the shape of the block is square as shown in FIG. 10, (DC) intra prediction my be performed using samples located in the reference line area indicated by the multiple reference line index information among the gray area or the shaded area. Alternatively, the DC value may be calculated using samples located in the reference line area indicated by the multiple reference line index information among the gray area or the shaded area. That is, the DC value can always be calculated using samples from the second sample of the reference line. Here, the gray area or the shaded area in reference line 0 may include corresponding reference line samples on the left and top sides of the current block, and the corresponding reference line samples on the top-left side of the current block may be excluded. In addition, the gray area or the shaded area in reference lines 1 to 3 may include some of the corresponding reference line samples on the left and top sides of the current block, and may include some of the corresponding reference line samples on the top-left side of the current block.

For example, in an embodiment, when the block shape is rectangular as shown in FIG. 11, intra prediction may be performed using samples located in the region of the reference line indicated by the multiple reference line index information among the gray area or the shaded area on the longer side (top side in FIG. 11) among the left side and top side of the block. Alternatively, the DC value may be calculated using samples in the region of the reference line indicated by the multiple reference line index information among the gray region or the shaded region on the longer side among the left side and the top side of the block. Here, the gray area or the shaded area in reference line 0 may include corresponding reference line samples of the longer side among the left and top sides of the current block, and the corresponding reference line samples at the top-left of the current block may be excluded. Also, the gray area or the shaded area in the reference lines 1 to 3 may include some of the reference line samples of the longer side among the left and the top side of the current block, and may include some of the corresponding reference line sample at the top-eft side of the current block.

Hereinafter, reference line samples neighboring to the left side and reference line samples neighboring to the top side of the current block will be described according to multi-reference line index information, which can be applied to both the case where the block shape is a square and a rectangle. Here, the reference line samples neighboring to the left side of the current block may include a left neighboring sample of the current block, and may further include a top-left neighboring sample. In addition, the reference line samples neighboring the top side of the current block may include a top neighboring sample of the current block, and may further include a top-left side neighboring sample.

In other words, when the block shape is square, intra prediction may be performed or a DC value may be calculated based on reference line samples neighboring to the left side and reference line samples neighboring to the top side, which will be described below. When the block has a rectangular shape, when the length of the left side is longer among the left side and the top side of the block, intra prediction can be performed or DC values can be calculated based on reference line samples neighboring to the left side, as described below, and when the length of the top side is longer among the left side and the top side of the block, intra prediction may be performed or a DC value may be calculated based on reference line samples neighboring the top side, as described below.

For convenience of description, it is assumed that the size of the current block is W(width)×H(Height), and the top-left sample position of the current block is (0, 0). Here, W and H may each have an integer value, and may be the same as or different from each other.

For example, when the multiple reference line index information indicates reference line 0, reference line samples neighboring to the left side of the current block may include samples located from (−1, 0) to (−1, H−1). When the multiple reference line index information indicates reference line 1, reference line samples neighboring to the left side of the current block may include samples located from (−2, −1) to (−2, H−2). When the multiple reference line index information indicates reference line 2, reference line samples neighboring to the left side of the current block may include samples located from (−3, −2) to (−3, H−3). When the multiple reference line index information indicates the reference line 3, reference line samples neighboring to the left side of the current block may include samples located from (−4, −3) to (−4, H−4).

That is, when the multiple reference line index information indicates the reference line N, the positions of reference samples may be expressed as (−N−1, y), and samples up to a sample corresponding to (x, H−N−1) may be used for prediction. Alternatively, when the multiple reference line index information indicates the reference line N, reference line samples neighboring to the left side of the current block may include samples located from (−N−1, −N) to (−N−1, H−N−1). Here, N may be referred to as a reference line value or a reference line index value, and may be 0, 1, 2, or 3.

For example, when the multiple reference line index information indicates the reference line 0, reference line samples neighboring the top side of the current block may include samples located from (0, −1) to (W−1, −1). When the multiple reference line index information indicates the reference line 1, reference line samples neighboring the top side of the current block may include samples located from (−1, −2) to (W−2, −2). When the multiple reference line index information indicates the reference line 2, reference line samples neighboring the top side of the current block may include samples located from (−2, −3) to (W−3, −3). When the multiple reference line index information indicates the reference line 3, reference line samples neighboring the top side of the current block may include samples located from (−3, −4) to (W−4, −4).

That is, when the multiple reference line index information indicates the reference line N, the positions of the reference samples may be expressed as (x, −N−1), and samples up to a sample corresponding to (W−N−1, y) may be used for prediction. Alternatively, when the multiple reference line index information indicates the reference line N, reference line samples neighboring the top side of the current block may include samples located from (−N, −N−1) to (W−N−1, −N−1). Here, N may be referred to as a reference line value or a reference line index value, and may be 0, 1, 2, or 3.

Figure 12:
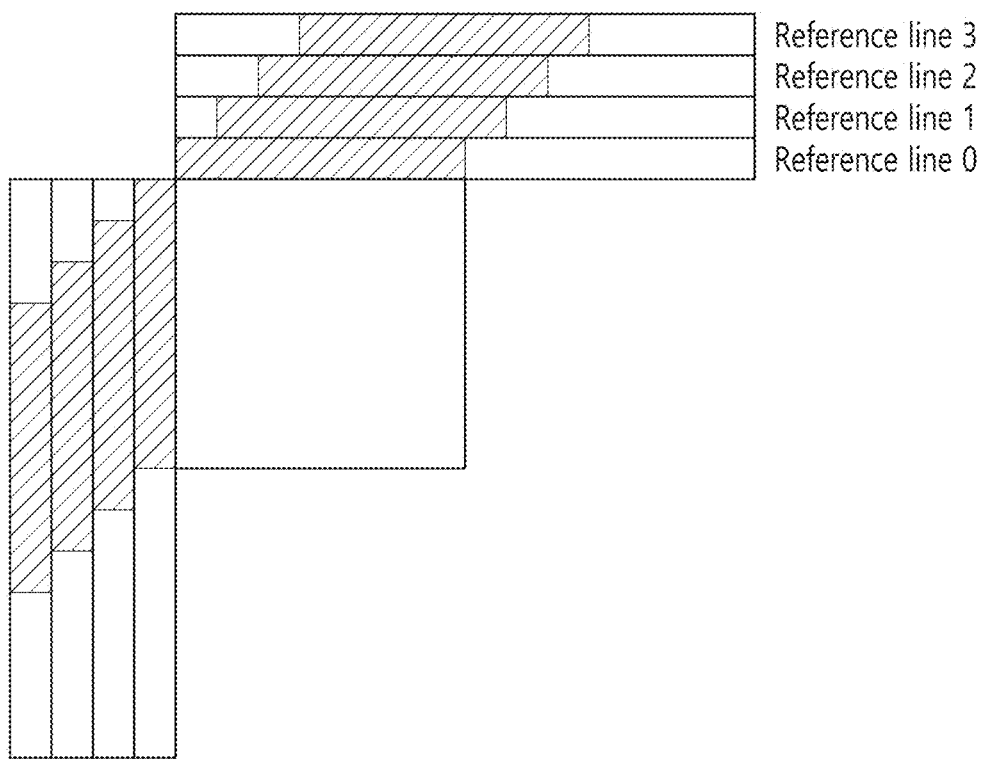
FIG. 12 shows another example of reference samples used for DC mode in MRL intra prediction when the current block has a square shape.

FIG. 12 shows another example of reference samples used for DC mode in MRL intra prediction when the current block has a square shape.

Figure 13:
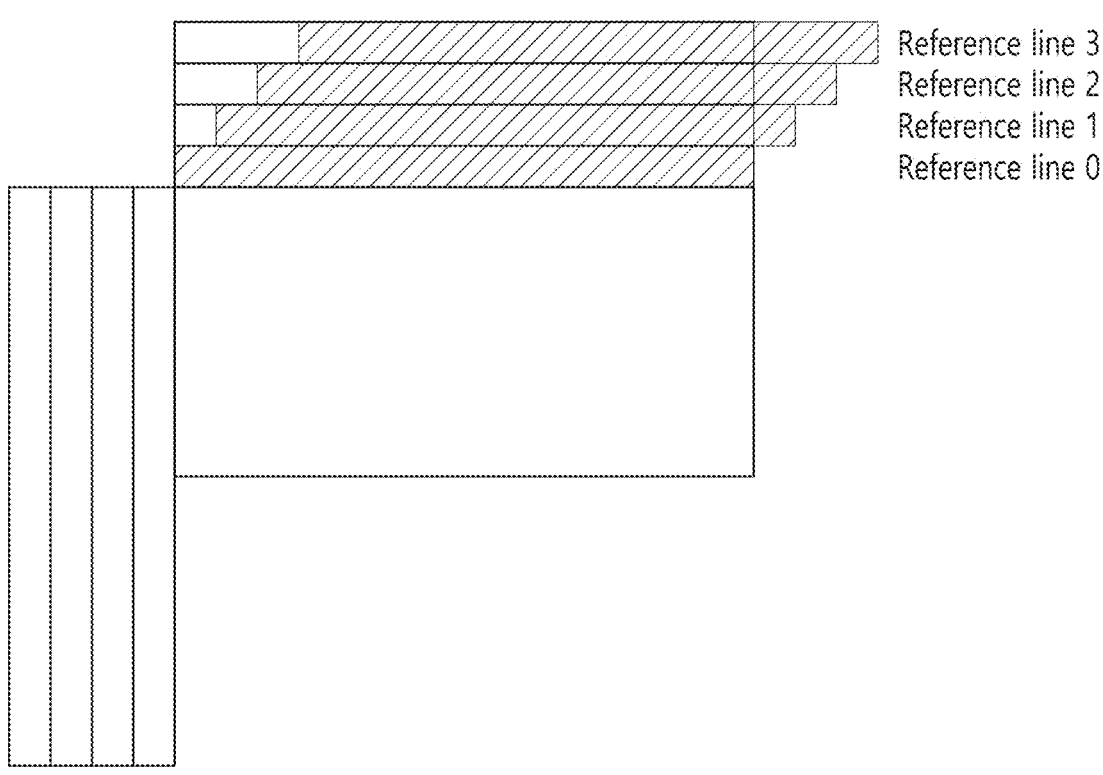
FIG. 13 shows another example of reference samples used for DC mode in MRL intra prediction when the current block has a rectangular shape.

FIG. 13 shows another example of reference samples used for DC mode in MRL intra prediction when the current block has a rectangular shape.

For example, in an embodiment, when the shape of the block is square as shown in FIG. 12, (DC) intra prediction may be performed using samples located in the reference line area indicated by the multiple reference line index information among the gray area or the shaded area. Alternatively, the DC value may be calculated using samples located in the reference line area indicated by the multiple reference line index information among the gray area or the shaded area. That is, the DC value can always be calculated by using the sample corresponding to the reference line number or index number. Here, the gray area or the shaded area in reference line 0 may include corresponding reference line samples on the left and top sides of the current block, and the corresponding reference line samples on the top-right and bottom-left sides of the current block may be excluded. In addition, the gray area or the shaded area in the reference lines 1 to 3 may include some of the reference line samples on the left and top sides of the current block, and may include some of the reference line samples on the top-right and bottom-left sides of the current block.

For example, in an embodiment, when the block shape is rectangular as shown in FIG. 13, (DC) intra prediction may be performed using samples located in the region of the reference line indicated by the multiple reference line index information among the gray area or the shaded area on the longer side (top side in FIG. 11) among the left side and top side of the block. Alternatively, the DC value may be calculated using samples in the region of the reference line indicated by the multiple reference line index information among the gray region or the shaded region on the longer side among the left side and the top side of the block. Here, the gray area or the shaded area in reference line 0 may include corresponding reference line samples of the longer side among the left side and the top side of the current block, and the corresponding reference line samples at the top-right or bottom-left side of the current block may be excluded. In addition, the gray area or the shaded area in the reference lines 1 to 3 may include some of the reference line samples of the longer side among the left side and the top side of the current block, and may include some of the corresponding reference line samples at the top-right or bottom-left side of the current block.

Hereinafter, reference line samples neighboring to the left side and reference line samples neighboring to the top side of the current block will be described according to multi reference line index information, which can be applied to both the case where the block shape is a square and a rectangle. Here, the reference line samples neighboring to the left side of the current block may include a left neighboring sample of the current block, and may further include a bottom-left neighboring sample. Also, the reference line samples neighboring the top side of the current block may include a top neighboring sample of the current block, and may further include a top-right neighboring sample.

In other words, when the block shape is square, intra prediction may be performed or a DC value may be calculated based on reference line samples neighboring to the left side and reference line samples neighboring to the top side, as described below. When the block has a rectangular shape, when the length of the left side among the left side and the top side of the block is longer, intra prediction can be performed or DC values can be calculated based on reference line samples neighboring to the left side as described below, and when the length of the top side is longer, intra prediction may be performed or a DC value may be calculated based on reference line samples neighboring the top side, as described below.

For convenience of description, it is assumed that the size of the current block is W(width)×H(Height), and the top-left sample position of the current block is (0, 0). Here, W and H may each have an integer value, and may be the same as or different from each other.

For example, when the multiple reference line index information indicates reference line 0, reference line samples neighboring to the left side of the current block may include samples located from (−1, 0) to (−1, H−1). When the multi-reference line index information indicates reference line 1, reference line samples neighboring to the left side of the current block may include samples located from (−2, 1) to (−2, H). When the multiple reference line index information indicates reference line 2, reference line samples neighboring to the left side of the current block may include samples located from (−3, 2) to (−3, H+1). When the multi-reference line index information indicates reference line 3, reference line samples neighboring to the left side of the current block may include samples located from (−4, 3) to (−4, H+2).

That is, when the multiple reference line index information indicates the reference line N, the positions of the reference samples may be expressed as (−N−1, y), and samples up to a sample corresponding to (x, H+N−1) may be used for prediction. Alternatively, when the multiple reference line index information indicates the reference line N, reference line samples neighboring to the left side of the current block may include samples located from (−N−1, N) to (−N−1, H+N−1). Here, N may be referred to as a reference line value or a reference line index value, and may be 0, 1, 2, or 3.

For example, when the multiple reference line index information indicates the reference line 0, reference line samples neighboring the top side of the current block may include samples located from (0, −1) to (W−1, −1). When the multiple reference line index information indicates the reference line 1, reference line samples neighboring the top side of the current block may include samples located from (1, −2) to (W, −2). When the multiple reference line index information indicates reference line 2, reference line samples neighboring to the top side of the current block may include samples located from (2, −3) to (W+1, −3). When the multiple reference line index information indicates the reference line 3, reference line samples neighboring the top side of the current block may include samples located from (3, −4) to (W+2, −4).

That is, when the multiple reference line index information indicates the reference line N, the positions of the reference samples may be expressed as (x, −N−1), and samples up to a sample corresponding to (W+N−1, y) may be used for prediction. Alternatively, when the multiple reference line index information indicates the reference line N, reference line samples neighboring the top side of the current block may include samples located from (N, −N−1) to (W+N−1, −N−1). Here, N may be referred to as a reference line value or a reference line index value, and may be 0, 1, 2, or 3.

In the embodiment intra prediction may be performed based on the DC value calculated as described above. Alternatively, a predicted block of the current block may be generated based on the DC value. Alternatively, samples included in the current block may be filled with DC values and then filtered to generate a predicted block of the current block.

Figure 14:
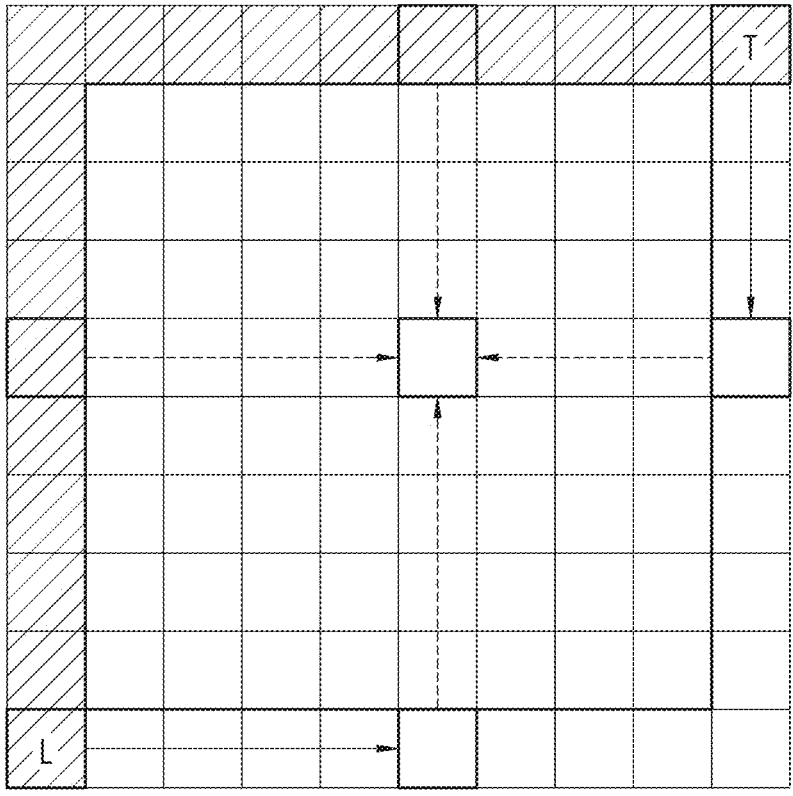
FIG. 14 shows an example of reference samples used in the planar mode.

FIG. 14 shows an example of reference samples used in the planar mode.

First, according to an embodiment, intra prediction based on a planar mode as shown in FIG. 14 may be performed when intra prediction not using multiple reference lines is performed, when multiple reference line index information indicates reference line 0, or when the mrl_idx field has a value of 0.

For example, according to an embodiment, a prediction sample may be derived based on interpolation with respect to a current sample in a block, as shown in FIG. 14. Alternatively, the prediction sample of the current sample in the current block may be derived by performing interpolation based on a left neighboring sample and a top neighboring sample adjacent to the current block. Alternatively, the prediction sample of the current sample in the current block may be derived through interpolation between a left neighboring sample, a lower left neighboring sample, a top neighboring sample, and a right neighboring sample adjacent to the current block.

For example, based on the top-left sample position of the current block being (0, 0), when the position of the current sample is (x, y) and the size of the current block is W×H, the prediction sample of the current sample may be derived based on interpolation between a sample at position (−1, y) a sample at position (W, −1), a sample at position (x, −1), and a sample at position (−1, H). Here, W and H may each have an integer value, and may be the same as or different from each other. Alternatively, the sample at position (W, −1) is copied to the sample at position (W, y), the sample at position (−1, H) is copied to the sample at position (x, H), and the prediction sample of the current sample can be derived based on interpolation between a sample at position (−1, y), a sample at position (W, y), a sample at position (x, −1), and a sample at position (x, H).

According to the embodiment, prediction samples may be derived as described above for samples in the current block. Alternatively, a predicted block of the current block including the prediction samples derived as described above may be generated.

Figure 15:
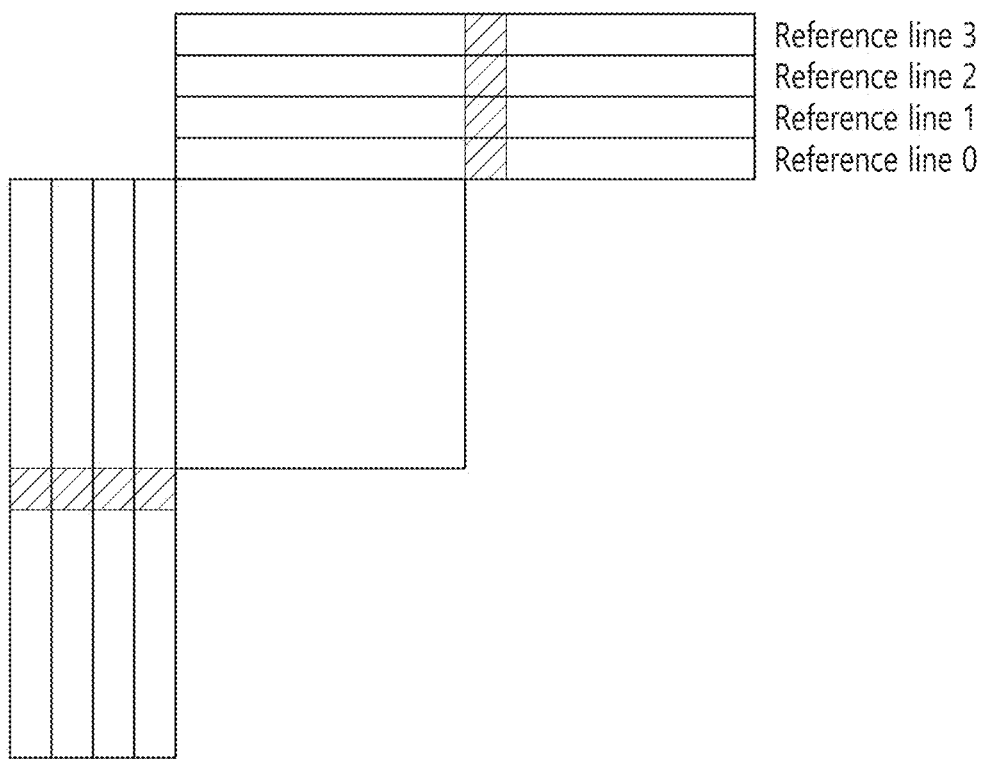
FIG. 15 shows an example of reference samples used for planar mode in MRL intra prediction.

FIG. 15 shows an example of reference samples used for planar mode in MRL intra prediction.

According to an embodiment, for performing multi reference line intra prediction, when multi-reference line index information indicates reference line 0, 1, 2 or 3, or when the mrl_idx field has a value of 0, 1, 2 or 3, intra prediction based on the planar mode may be performed.

For example, the multiple reference line index information may indicate reference lines 0, 1, or 2, and the mrl_idx field may have a value of 0, 1, or 2. That is, when the mrl_idx field has a value of 0, the multi-reference line index information may indicate reference line 0, when the mrl_idx field has a value of 1, the multi-reference line index information may indicate reference line 1, and when the mrl_idx field has a value of 2, the multiple reference line index information may indicate reference line 2. Alternatively, the multiple reference line index information may indicate reference lines 0, 1, or 3, and the mrl_idx field may have a value of 0, 1, or 2. That is, when the mrl_idx field has a value of 0, the multi-reference line index information may indicate reference line 0, when the mrl_idx field has a value of 1, the multi-reference line index information may indicate reference line 1, and when the mrl_idx field has a value of 2, the multiple reference line index information may indicate reference line 3. Alternatively, the multiple reference line index information may indicate reference lines 0, 1, 2, or 3, and the mrl_idx field may have a value of 0, 1, 2, or 3. That is, when the mrl_idx field has a value of 0, the multi-reference line index information may indicate reference line 0, when the mrl_idx field has a value of 1, the multi-reference line index information may indicate reference line 1, when the mrl_idx field has a value of 2, the multi-reference line index information may indicate reference line 2, and when the mrl_idx field has a value of 3, the multi-reference line index information may indicate reference line 3.

The descriptions about the above-described multi-reference line index information or the mrl_idx field may be used in the embodiments described with reference to FIGS. 15 to 17.

For example, as shown in FIG. 15, the embodiment may perform (planner) intra prediction using a sample located in a region of a reference line indicated by multiple reference line index information among gray regions or shaded regions. Alternatively, the prediction sample may be generated through interpolation between samples located in the reference line area indicated by the multiple reference line index information among the gray area or the shaded area.

Alternatively, a sample located in the reference line area indicated by the multiple reference line index information among the gray area or the shaded area may be determined as a sample for the weight of the planar prediction. That is, the planar prediction may be performed using the sample at the +1 position at the end of the width/height of the current block.

For convenience of description, it is assumed that the size of the current block is W(width)×H(Height), and the top-left sample position of the current block is (0, 0). Here, W and H may each have an integer value, and may be the same as or different from each other.

Hereinafter, reference line samples neighboring to the left side and reference line samples neighboring to the top side of the current block will be described according to multi-reference line index information. Here, reference line samples neighboring to the left side of the current block may include samples from the bottom-left side of the current block. Also, reference line samples neighboring to the top side of the current block may include the top-right neighboring sample of the current block.

For example, when the multiple reference line index information indicates reference line 0, a reference line sample neighboring to the left side of the current block may include a sample located at (−1, H), and a neighboring reference line sample neighboring to the top side of the current block may include a sample located at (W, −1). When the multiple reference line index information indicates reference line 1, a reference line sample neighboring to the left side of the current block may include a sample located at (−2, H), and a reference line sample neighboring to the top side of the current block may include a sample located at (W, −2). When the multiple reference line index information indicates reference line 2, a reference line sample neighboring to the left side of the current block may include a sample located at (−3, H), and a reference line sample neighboring to the top side of the current block may include a samples located at (W, −3). When the multiple reference line index information indicates reference line 3, a reference line sample neighboring to the left side of the current block may include a sample located at (−4, H), and a reference line sample neighboring to the top side of the current block may include a sample located at (W, −4).

That is, when the reference line indicated by the multi-reference line index information is the reference line N, planar prediction may be performed using the sample located at (−N−1, H) and the sample located at (W, −N−1). Alternatively, the above-described samples may be determined as samples for weighting the planar prediction. Alternatively, the prediction sample may be generated through interpolation between samples including the above-described samples. The reference samples of the current block may include the above-described samples, samples located outside the current block, samples used for interpolation, or neighboring samples of the current block. Also, here, the reference line sample neighboring to the left side of the current block may include a sample located at (−N−1, H), and the reference line sample neighboring to the top side of the current block may include a sample located at (W, −N−1). Here, N may be referred to as a reference line value or a reference line index value, and may be 0, 1, 2, or 3.

Figure 16:
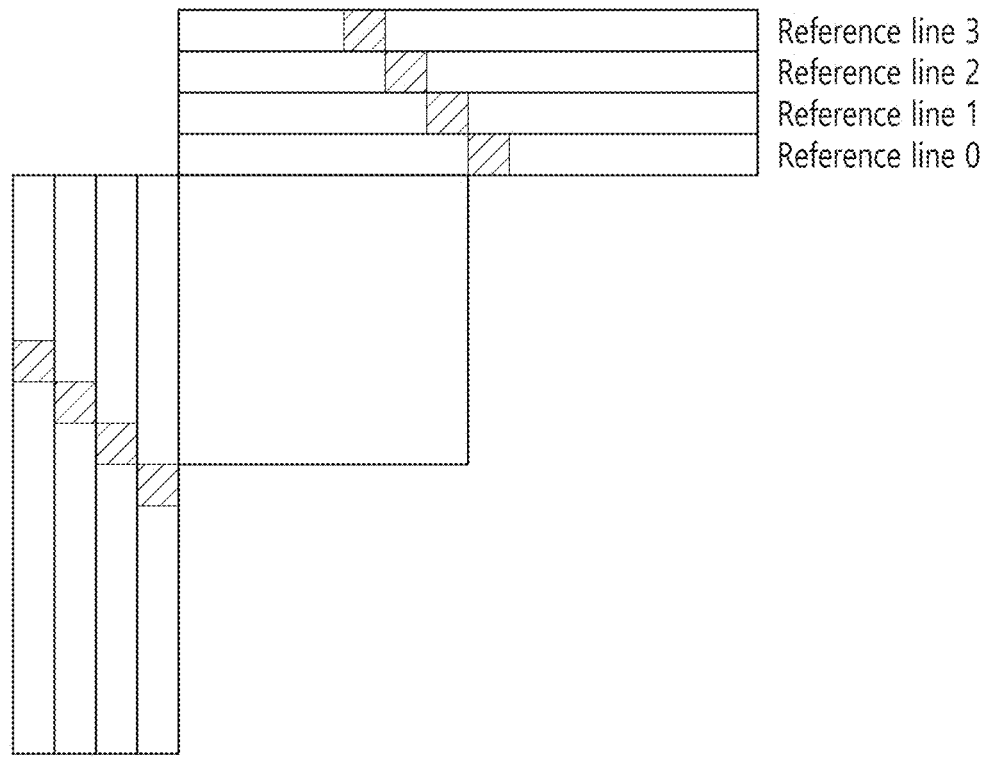
FIG. 16 shows another example of reference samples used for planar mode in MRL intra prediction.

FIG. 16 shows another example of reference samples used for planar mode in MRL intra prediction.

For example, as shown in FIG. 16, according to the embodiment, (planner) intra prediction may be performed using a sample located in a region of a reference line indicated by multiple reference line index information among gray regions or shaded regions. Alternatively, the prediction sample may be generated through interpolation between samples located in the reference line area indicated by the multiple reference line index information among the gray area or the shaded area. Alternatively, a sample located in the reference line area indicated by the multiple reference line index information among the gray area or the shaded area may be determined as a sample for the weight of the planar prediction. That is, planar prediction may be performed using a sample at a position obtained by subtracting a reference line number from the +1 position at the end of the width/height of the current block. Here, the reference line number may indicate a reference line value or a reference line index value obtained by the multiple reference line index information.

For convenience of description, it is assumed that the size of the current block is W(width)×H(Height), and the top-left sample position of the current block is (0, 0). Here, W and H may each have an integer value, and may be the same as or different from each other.

Hereinafter, reference line samples neighboring to the left side and reference line samples neighboring to the top side of the current block will be described according to multi-reference line index information. Here, the reference line samples neighboring to the left side of the current block may include a left neighboring sample or a bottom-left neighboring sample of the current block. Also, reference line samples neighboring to the top side of the current block may include top neighboring samples or top-right neighboring samples of the current block.

For example, when the multiple reference line index information indicates reference line 0, a reference line sample neighboring to the left side of the current block may include a sample located at (−1, H), and a reference line sample neighboring to the top side of the current block may include a sample located at (W, −1). When the multiple reference line index information indicates reference line 1, a reference line sample neighboring to the left side of the current block may include a sample located at (−2, H−1), and a reference line sample neighboring reference the top side the current block may include a sample located at (W−1, −2). When the multiple reference line index information indicates the reference line 2, a reference line sample neighboring to the left side of the current block may include a sample located at (−3, H−2), and a reference line sample neighboring to the top side of the current block may include a sample located at (W−2, −3). When the multiple reference line index information indicates the reference line 3, a reference line sample neighboring to the left side of the current block may include a sample located at (−4, H−3), and a reference line sample neighboring to the top side of the current block may include a sample located at (W−3, −4).

That is, when the reference line indicated by the multi-reference line index information is the reference line N, planar prediction may be performed using the sample located at (−N−1, H−N) and the sample located at (W−N, −N−1). Alternatively, the above-described samples may be determined as samples for weighting the planar prediction. Alternatively, the prediction sample may be generated through interpolation between samples including the above-described samples. The reference samples of the current block may include the above-described samples, samples located outside the current block, samples used for interpolation, or neighboring samples of the current block. Also, here, the reference line sample neighboring to the left side of the current block may include a sample located at (−N−1, H−N), and the reference line sample neighboring to the top side may include a sample located at (WN, −N−1). Here, N may be referred to as a reference line value or a reference line index value, and may be 0, 1, 2, or 3.

Figure 17:
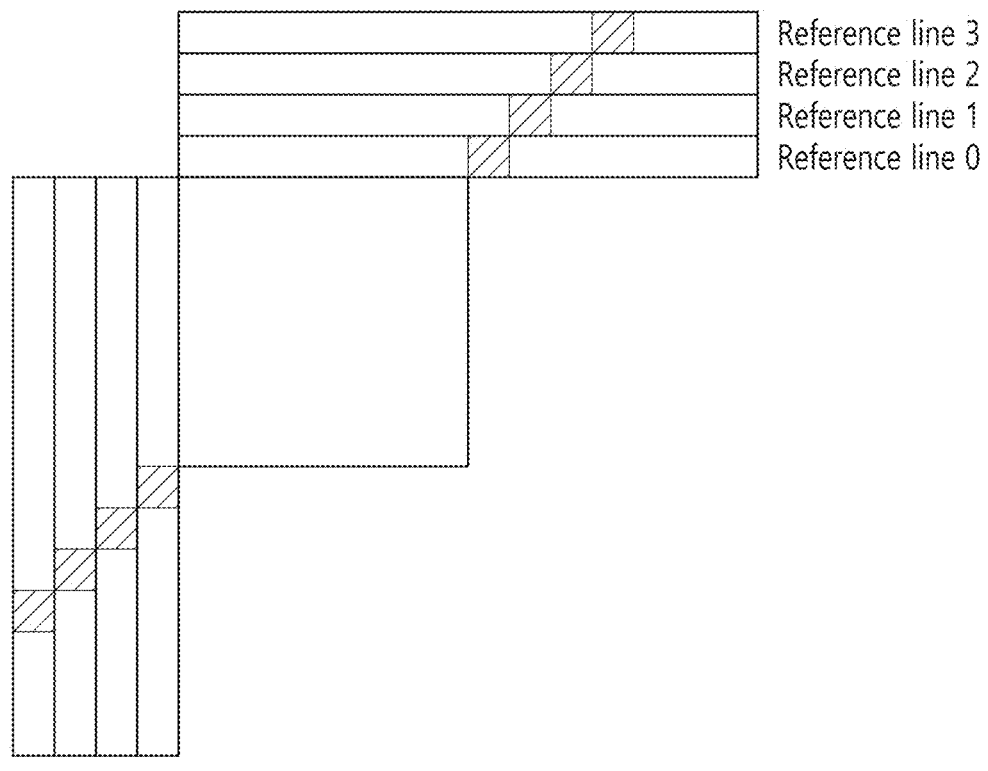
FIG. 17 shows another example of reference samples used for planar mode in MRL intra prediction.

FIG. 17 shows another example of reference samples used for planar mode in MRL intra prediction.

For example, as shown in FIG. 17, according to the embodiment, (planner) intra prediction may be performed using a sample located in a region of a reference line indicated by multiple reference line index information among gray regions or shaded regions. Alternatively, the prediction sample may be generated through interpolation between samples located in the reference line area indicated by the multiple reference line index information among the gray area or the shaded area. Alternatively, a sample located in the reference line area indicated by the multiple reference line index information among the gray area or the shaded area may be determined as a sample for the weight of the planar prediction. That is, planar prediction may be performed using a sample at a position of +1 at the end of the width/height of the current block plus a reference line number. Here, the reference line number may indicate a reference line value or a reference line index value obtained by the multiple reference line index information.

For convenience of description, it is assumed that the size of the current block is W(width)×H(Height), and the top-left sample position of the current block is (0, 0). Here, W and H may each have an integer value, and may be the same as or different from each other.

Hereinafter, reference line samples neighboring to the left side and reference line samples neighboring to the top side of the current block will be described according to multi-reference line index information. Here, the reference line samples neighboring to the left side of the current block may include a left neighboring sample or a bottom-left neighboring sample of the current block. Also, reference line samples neighboring to the top side of the current block may include top neighboring samples or top-right neighboring samples of the current block.

For example, when the multiple reference line index information indicates reference line 0, a reference line sample neighboring to the left side of the current block may include a sample located at (−1, H), and a reference line sample neighboring to the top side of the current block may include a sample located at (W, −1). When the multiple reference line index information indicates reference line 1, a reference line sample neighboring to the left side of the current block may include a sample located at (−2, H+1), and a reference line sample neighboring to the top side of the current block may include a sample located at (W+1, −2). When the multiple reference line index information indicates reference line 2, a reference line sample neighboring to the left side of the current block may include a sample located at (−3, H+2), and a reference line sample neighboring to the top side of the current block may include a sample located at (W+2, −3). When the multiple reference line index information indicates reference line 3, a reference line sample neighboring to the left side f the current block may include a sample located at (−4, H+3), and a reference line sample neighboring to the top side of the current block may include a sample located at (W+3, −4).

That is, when the reference line indicated by the multiple reference line index information is the reference line N, planar prediction can be performed using the sample located at (−N−1, H+N) and the sample located at (W+N, −N−1) Alternatively, the above-described samples may be determined as samples for weighting the planar prediction. Alternatively, the prediction sample may be generated through interpolation between samples including the above-described samples. The reference samples of the current block may include the above-described samples, samples located outside the current block, samples used for interpolation, or neighboring samples of the current block. Also, here, the reference line sample neighboring to the left side of the current block may include a sample located at (−N−1, H+N), and the reference line sample neighboring to the top side may include a sample located at (W+N, −N−1). Here, N may be referred to as a reference line value or a reference line index value, and may be 0, 1, 2, or 3.

Figure 18:
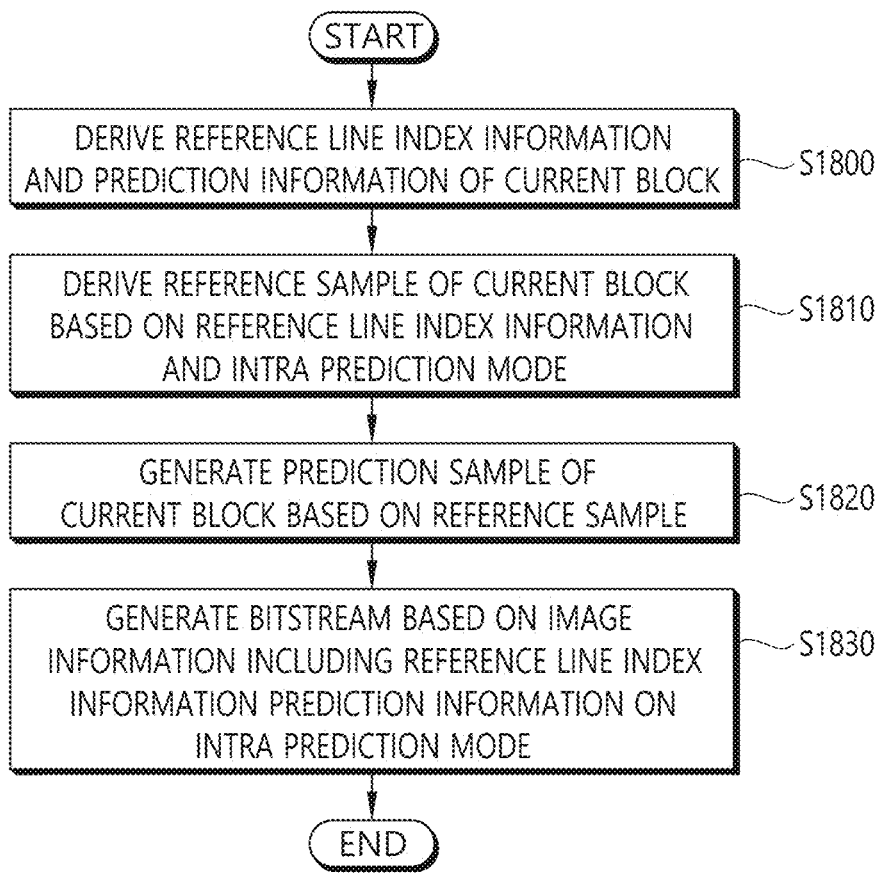
FIG. 18 schematically illustrates an image encoding method by an encoding apparatus according to the present document.

FIG. 18 schematically illustrates an image encoding method by an encoding apparatus according to the present document.

The method disclosed in FIG. 18 may be performed by the encoding apparatus disclosed in FIG. 2. Specifically, for example, steps S1800 to S1820 of FIG. 18 may be performed by the predictor of the encoding apparatus, and step S1830 may be performed by the entropy encoder of the encoding apparatus. In addition, although not shown, the process of deriving the residual sample for the current block based on the original sample and the prediction sample for the current block may be performed by a subtractor of the encoding apparatus, and the process of generating information on the residual for the current block based on the residual sample may be performed by a transformer of the encoding apparatus, and the process of encoding the information on the residual and information on prediction of the current block may be performed by the entropy encoder of the encoding apparatus.

The encoding apparatus derives reference line index information and an intra prediction mode for the current block (S1800). For example, reference line index information may be referred to as multiple reference line index information. The reference line index information may include information about reference lines of neighboring samples of the current block to be used for intra prediction of the coding unit. Alternatively, the reference line index information may include an intra_luma_ref_idx field, and information on reference lines of neighboring reference samples to be used for intra prediction among a plurality of reference lines may be obtained based on the intra_luma_ref_idx field. Alternatively, information on reference lines of neighboring reference samples to be used for intra prediction may be obtained as reference line 0, reference line 1, or reference line 3 based on the intra_luma_ref_idx field. Alternatively, reference line 0, reference line 1 or reference line 2 may be obtained. Alternatively, the intra_luma_ref_idx field may include a value of 0, 1, or 2, and based on this, reference line 0, reference line 1, or reference line 3 may be obtained as reference lines of neighboring reference samples to be used for intra prediction, respectively. Alternatively, based on this, reference line 0, reference line 1, or reference line 2 may be obtained as reference lines of neighboring reference samples to be used for intra prediction, respectively. Alternatively, a reference line index value may be derived based on the reference line index information. Here, the reference line index value may be derived as 0, 1, or 3, and may indicate reference line 0, reference line 1, or reference line 3, respectively, which may be indicated by the IntraLumaRefLineIdx field. Alternatively, the reference line index value may be derived as 0, 1, or 2, and may indicate reference line 0, reference line 1, or reference line 2, respectively, which may be indicated by the IntraLumaRefLineIdx field.

The reference line may indicate a line of neighboring samples located at a specific sample distance from the current block. For example, when the reference line is a reference line 0 (reference line 0), the reference line include a line of top neighboring samples adjacent to a top boundary of the current block and a line of left neighboring samples adjacent to a left boundary of the current block. For example, when the reference line is the reference line 1 (reference line No. 1), the reference line include a line of top neighboring samples located at a distance of 1 sample from the top boundary of the current block and a line of left neighboring samples located at a distance of 1 sample from the left boundary of the current block. For example, when the reference line is the reference line 2 (reference line 2), the reference line include a line of top neighboring samples located at a distance of 2 samples from the top boundary of the current block and a line of left neighboring samples located at a distance of 2 samples from the left boundary of the current block. For example, when the reference line is a reference line 3 (reference line 3), the reference line include a line of top neighboring samples located at a distance of 3 samples from the top boundary of the current block and a line of left neighboring samples located at a distance of 3 samples from the left boundary of the current block. Also, the reference line may be referred to as a reference line sample.

For example, the intra prediction mode may include a non-directional intra prediction mode. The non-directional intra prediction mode may be referred to as a non-angular intra prediction mode or a non-angular mode. Alternatively, it may be referred to as a non-directional intra mode, a non-directional prediction mode, or a non-directional mode. The non-directional intra prediction mode may include two intra prediction modes. Alternatively, the non-directional prediction mode may include a DC mode or a planar mode.

The encoding apparatus derives the reference sample of the current block based on the reference line index information and the intra prediction mode (S1810). For example, the reference sample may be derived based on the non-directional intra prediction mode and the reference line index information among neighboring samples of the current block. Alternatively, the reference sample may include a sample positioned on a reference line among the neighboring samples. Alternatively, the reference sample may include a sample located at a specific sample distance from the current block (or a boundary of the current block) among the neighboring samples. Here, the reference line may be derived based on the reference line index information. Alternatively, the specific sample distance may be derived based on the reference line index information.

For example, when the non-directional intra prediction mode is the DC mode, the reference sample may be derived based on the reference line index information according to the DC mode. Alternatively, the reference sample may include a sample positioned on a reference line among the neighboring samples according to a DC mode. Alternatively, the reference sample may include a sample located at a specific sample distance from the current block (or a boundary of the current block) among the neighboring samples according to the DC mode. Here, the reference line may be derived based on the reference line index information. Alternatively, the specific sample distance may be derived based on the reference line index information. Also, for example, the reference sample may include left neighboring samples and top neighboring samples of the current block. Alternatively, the reference sample may include left neighboring samples or top neighboring samples of the current block. Here, the left neighboring samples may be indicated as samples neighboring to the left side of the current block, and the top neighboring samples may be indicated as samples neighboring to the top side of the current block.

For example, when the current block has a square shape or when the width and height of the current block have the same length, the reference sample may include left neighboring samples and top neighboring samples of the current block.

For example, assuming that the size of the current block is W(width)×H(Height), the top-left sample position of the current block is (0, 0), and the reference line index value is N, the reference sample may include samples located in (−1−N, 0) to (−1−N, H−1) coordinates and samples located in (0, −1−N) to (W−1, −1−N) coordinates. Here, the left neighboring samples may include samples located in (−1−N, 0) to (−1−N, H−1) coordinates, and the top neighboring samples may include samples located in (0, −1−N) to (W−1, −1−N) coordinates. Alternatively, the reference sample may include samples located in (−1−N, −N) to (−1−N, H−N−1) coordinates and samples located in (−N, −1−N) to (W−N−1, −1−N) coordinates. Here, the left neighboring samples may include samples located in (−1−N, −N) to (−1−N, H−N−1) coordinates, and the top neighboring samples may include samples located in (−N, −1−N) to (W−N−1, −1−N) coordinates. Or the reference sample may include samples located in es (−1−N, N) to (−1−N, H+N−1) coordinates or samples located in (N, −1−N) to (W+N−1, −1−N) coordinates. Here, the left neighboring samples may include samples located in (−1−N, N) to (−1−N, H+N−1) coordinates, and the top neighboring samples may include samples located in (N, −1−N) to (W+N−1, −1−N) coordinates.

For example, when the current block has a rectangular shape or when the width and height of the current block are different from each other, the reference sample may include left neighboring samples or top neighboring samples of the current block.

For example, when the width of the current block is greater than the height, the reference sample may include top neighboring samples of the current block. For example, the top neighboring samples may include samples located in (0, −1−N) to (W−1, −1−N) coordinates. Alternatively, the top neighboring samples may include samples located at coordinates (−N, −1−N) to (W−N−1, −1−N). Alternatively, the top neighboring samples may include samples located in (N, −1−N) to (W+N−1, −1−N) coordinates.

For example, when the width of the current block is smaller than the height, the reference sample may include left neighboring samples of the current block. For example, the left neighboring samples may include samples located in (−1−N, 0) to (−1−N, H−1) coordinates. Alternatively, the left neighboring samples may include samples located in (−1−N, −N) to (−1−N, H−N−1) coordinates. Alternatively, the left neighboring samples may include samples located in (−1−N, N) to (−1−N, H+N−1) coordinates.

Also, when the non-directional intra prediction mode is the DC mode, the decoding apparatus may determine the DC value based on the average of the reference samples. Here, the DC value may be expressed as dc Val.

For example, when the non-directional intra prediction mode is the planar mode, the reference sample may be derived according to the planar mode based on the reference line index information. Alternatively, the reference sample may include a sample located on a reference line among the neighboring samples according to a planar mode, and the reference line may be derived based on the reference line index information. Alternatively, the reference sample may include a sample located at a specific sample distance from the current block (or a boundary of the current block) among the neighboring samples according to a planar mode. Here, the reference line may be derived based on the reference line index information. Alternatively, the specific sample distance may be derived based on the reference line index information. Here, the reference sample may include a left neighboring sample and a top neighboring sample of the current block. Alternatively, the reference sample may include a bottom-left neighboring sample and a top-right neighboring sample. Alternatively, the reference sample may include a left neighboring sample, a bottom-left neighboring sample, a top neighboring sample, and a top-right neighboring sample. Here, the sample neighboring to the left of the current block may include the left neighboring sample and/or the bottom-left neighboring sample, and the sample neighboring to the top side of the current block may include the top neighboring sample and/or the top-right neighboring sample.

For example, assuming that the size of the current block is W(width)×H(Height), the upper-left sample position of the current block is (0, 0), and the reference line index value is N, the reference sample may include a sample located at (−1−N, H) coordinates and a sample located at (W, −1−N) coordinates. Alternatively, the reference sample may include a sample located at (−1−N, H−N) coordinates and a sample located at (W−N, −1−N) coordinates. Alternatively, the reference sample may include a sample located at (−1−N, H+N) coordinates and a sample located at (W+N, −1−N) coordinates.

The encoding apparatus generates a prediction sample of the current block based on the reference sample (S1820). Alternatively, the encoding apparatus may directly use the prediction sample as a reconstructed sample according to a prediction mode. Also, the encoding apparatus may generate a predicted block of the current block based on the prediction sample. Also, the encoding apparatus may generate a residual sample based on the original sample and the generated prediction sample. The encoding apparatus may generate information on the residual based on the residual sample. The information on the residual may include transform coefficients on the residual sample. The encoding apparatus may derive the reconstructed sample based on the prediction sample and the residual sample. That is, the encoding apparatus may derive the reconstructed sample by adding the prediction sample and the residual sample. Here, the encoding apparatus may generate a residual block based on the original block and the predicted block, and may also generate information on the residual based on the residual block.

The encoding apparatus generates a bitstream based on image information including reference line index information and prediction information regarding an intra prediction mode (S1830). For example, the encoding apparatus may determine the prediction mode of the current block and may generate information indicating the prediction mode. Alternatively, the encoding apparatus may determine the intra prediction mode of the current block, and may generate prediction information of the current block including information on the intra prediction mode. The prediction information may include information on prediction of the current block or various information for prediction. The prediction information may include MPM list related information. Alternatively, the MPM list related information may include MPM index information for an intra prediction mode used for intra prediction of a current block in the MPM list.

Also, the encoding apparatus may generate reference line index information. Also, the encoding apparatus may generate information on the residual. The encoding apparatus may generate a bitstream by encoding image information including all or part of the above-described information. Alternatively, it can be output in the form of a bitstream. Also, the bitstream may be transmitted to the decoding apparatus through a network or a storage medium. Alternatively, the bitstream may be stored in a computer-readable storage medium.

Figure 19:
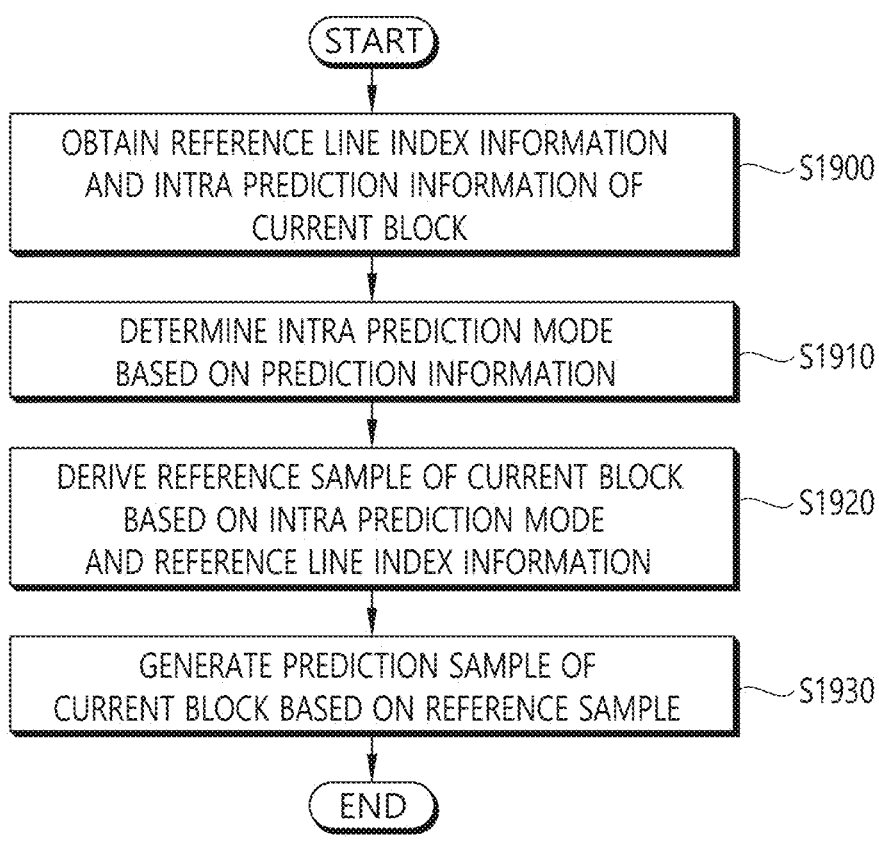
FIG. 19 schematically shows an image decoding method by a decoding apparatus according to the present document.

FIG. 19 schematically shows an image decoding method by a decoding apparatus according to the present document. The method disclosed in FIG. 19 may be performed by the decoding apparatus disclosed in FIG. 3. Specifically, for example, S1900 of FIG. 19 may be performed by the entropy decoder of the decoding apparatus, and S1910 to S1930 may be performed by the predictor of the decoding apparatus. In addition, although not shown, the process of acquiring image information including information on prediction of a current block and information on residual through a bitstream may be performed by an entropy decoder of the decoding apparatus, and the the process of deriving the residual sample for the current block based on the residual information may be performed by an inverse transformer of the decoding apparatus, and a process of generating a reconstructed picture based on a prediction sample and a residual sample may be performed by an adder of the decoding apparatus.

The decoding apparatus obtains reference line index information and prediction information for the current block (S1900). The prediction information may include information on the intra prediction mode of the current block. Alternatively, information on prediction of the current block or various information for prediction may be included. For example, the decoding apparatus may obtain reference line index information and prediction information for the current block from the bitstream.

For example, reference line index information may be referred to as multiple reference line index information. The reference line index information may include information about reference lines of neighboring samples of the current block to be used for intra prediction of the coding unit. Alternatively, the reference line index information may include an intra_luma_ref_idx field, and information on reference lines of neighboring reference samples to be used for intra prediction among a plurality of reference lines may be obtained based on the intra_luma_ref_idx field. Alternatively, information on reference lines of neighboring reference samples to be used for intra prediction may be obtained as reference line 0, reference line 1, or reference line 3 based on the intra_luma_ref_idx field. Alternatively, reference line 0, reference line 1 or reference line 2 may be obtained. Alternatively, the intra_luma_ref_idx field may include a value of 0, 1, or 2, and based on this, reference line 0, reference line 1, or reference line 3 may be obtained as reference lines of neighboring reference samples to be used for intra prediction, respectively. Alternatively, based on this, reference line 0, reference line 1, or reference line 2 may be obtained as reference lines of neighboring reference samples to be used for intra prediction, respectively. Alternatively, a reference line index value may be derived based on the reference line index information. Here, the reference line index value may be derived as 0, 1, or 3, and may indicate reference line 0, reference line 1, or reference line 3, respectively, which may be indicated by the IntraLumaRefLineIdx field. Alternatively, the reference line index value may be derived as 0, 1, or 2, and may indicate reference line 0, reference line 1, or reference line 2, respectively, which may be indicated by the IntraLumaRefLineIdx field.

The reference line may indicate a line of neighboring samples located at a specific sample distance from the current block. For example, when the reference line is a reference line 0 (reference line 0), the reference line include a line of top neighboring samples adjacent to a top boundary of the current block and a line of left neighboring samples adjacent to a left boundary of the current block. For example, when the reference line is the reference line 1 (reference line No. 1), the reference line include a line of top neighboring samples located at a distance of 1 sample from the top boundary of the current block and a line of left neighboring samples located at a distance of 1 sample from the left boundary of the current block. For example, when the reference line is the reference line 2 (reference line 2), the reference line include a line of top neighboring samples located at a distance of 2 samples from the top boundary of the current block and a line of left neighboring samples located at a distance of 2 samples from the left boundary of the current block. For example, when the reference line is a reference line 3 (reference line 3), the reference line include a line of top neighboring samples located at a distance of 3 samples from the top boundary of the current block and a line of left neighboring samples located at a distance of 3 samples from the left boundary of the current block. Also, the reference line may be referred to as a reference line sample.

The decoding apparatus determines the intra prediction mode of the current block based on the prediction information (S1910). The prediction information may include information on the intra prediction mode of the current block, and the decoding apparatus may determine the intra prediction mode of the current block based on the information on the intra prediction mode of the current block. Alternatively, the decoding apparatus may further obtain MPM list related information, and may determine an intra prediction mode based on the MPM list related information. Alternatively, the MPM list related information may include MPM index information, and the decoding apparatus may determine an intra prediction mode of the current block in the MPM list based on the MPM index information.

For example, the intra prediction mode may include a non-directional intra prediction mode. The non-directional intra prediction mode may be referred to as a non-angular intra prediction mode or a non-angular mode. Alternatively, it may be referred to as a non-directional intra mode, a non-directional prediction mode, or a non-directional mode. The non-directional intra prediction mode may include two intra prediction modes. Alternatively, the non-directional prediction mode may include a DC mode or a planar mode.

The decoding apparatus derives the reference sample of the current block based on the intra prediction mode and the reference line index information (S1920). For example, the reference sample may be derived based on the non-directional intra prediction mode and the reference line index information among neighboring samples of the current block. Alternatively, the reference sample may include a sample positioned on a reference line among the neighboring samples. Alternatively, the reference sample may include a sample located at a specific sample distance from the current block (or a boundary of the current block) among the neighboring samples. Here, the reference line may be derived based on the reference line index information. Alternatively, the specific sample distance may be derived based on the reference line index information.

For example, when the non-directional intra prediction mode is the DC mode, the reference sample may be derived according to the DC mode based on the reference line index information. Alternatively, the reference sample may include a sample positioned on a reference line among the neighboring samples according to a DC mode. Alternatively, the reference sample may include a sample located at a specific sample distance from the current block (or a boundary of the current block) among the neighboring samples according to the DC mode. Here, the reference line may be derived based on the reference line index information. Alternatively, the specific sample distance may be derived based on the reference line index information. Also, for example, the reference sample may include left neighboring samples and top neighboring samples of the current block. Alternatively, the reference sample may include left neighboring samples or top neighboring samples of the current block. Here, the left neighboring samples may be indicated as samples neighboring to the left of the current block, and the top neighboring samples may be indicated as samples neighboring to the top of the current block.

For example, when the current block has a square shape or when the width and height of the current block have the same length, the reference sample may include left neighboring samples and top neighboring samples of the current block.

For example, assuming that the size of the current block is W(width)×H(Height), the top-left sample position of the current block is (0, 0), and the reference line index value is N, the reference sample may include samples located in (−1−N, 0) to (−1−N, H−1) coordinates and samples located in (0, −1−N) to (W−1, −1−N) coordinates. Here, the left neighboring samples may include samples located in (−1−N, 0) to (−1−N, H−1) coordinates, and the top neighboring samples may include samples located in (0, −1−N) to (W−1, −1−N) coordinates. Alternatively, the reference sample may includes samples located in (−1−N, −N) to (−1−N, H−N−1) coordinates and samples located in (−N, −1−N) to (W−N−1, −1−N) coordinates. Here, the neighboring samples may include samples located in (−1−N, −N) to (−1−N, H−N−1) coordinates, and the top neighboring samples may include (−N, −1−N) to (W−N−1, −1−N) coordinates. Alternatively, the reference sample may include samples located in (−1−N, N) to (−1−N, H+N−1) coordinates or samples located in (N, −1−N) to (W+N−1, −1−N) coordinates. Here, the left neighboring samples may include samples located in (−1−N, N) to (−1−N, H+N−1) coordinates, and the top neighboring may include samples located in (N, −1−N) to (W+N−1, −1−N) coordinates.

For example, when the current block has a rectangular shape or when the width and height of the current block are different from each other, the reference sample may include left neighboring samples or upper neighboring samples of the current block.

For example, when the width of the current block is greater than the height, the reference sample may include top neighboring samples of the current block. For example, the top neighboring samples may include samples located in (0, −1−N) to (W−1, −1−N) coordinates. Alternatively, the top neighboring samples may include samples located in (−N, −1−N) to (W−N−1, −1−N) coordinates. Alternatively, the top neighboring samples may include samples located in (N, −1−N) to (W+N−1, −1−N) coordinates.

For example, when the width of the current block is smaller than the height, the reference sample may include left neighboring samples of the current block. For example, the left neighboring samples may include samples located in (−1−N, 0) to (−1−N, H−1) coordinates. Alternatively, the left neighboring samples may include samples located in (−1−N, −N) to (−1−N, H−N−1) coordinates. Alternatively, the left neighboring samples may include samples located in (−1−N, N) to (−1−N, H+N−1) coordinates.

Also, when the non-directional intra prediction mode is the DC mode, the decoding apparatus may determine the DC value based on the average of the reference samples. Here, the DC value may be expressed as dc Val.

For example, when the non-directional intra prediction mode is the planar mode, the reference sample may be derived according to the planar mode based on the reference line index information. Alternatively, the reference sample may include a sample located on a reference line among the neighboring samples according to a planar mode, and the reference line may be derived based on the reference line index information. Alternatively, the reference sample may include a sample located at a specific sample distance from the current block (or a boundary of the current block) among the neighboring samples according to a planar mode. Here, the reference line may be derived based on the reference line index information. Alternatively, the specific sample distance may be derived based on the reference line index information. Here, the reference sample may include a left neighboring sample and a top neighboring sample of the current block. Alternatively, the reference sample may include a bottom-left neighboring sample and a top-right neighboring sample. Alternatively, the reference sample may include a left neighboring sample, a bottom-left neighboring sample, a top neighboring sample, and a top-right neighboring sample. Here, the sample neighboring to the left of the current block may include the left neighboring sample and/or the bottom-left neighboring sample, and the sample neighboring to the top side of the current block may include the top neighboring sample and/or the top-right neighboring sample.

For example, assuming that the size of the current block is W(width)×H(Height), the upper-left sample position of the current block is (0, 0), and the reference line index value is N, the reference sample may include a sample located at (−1−N, H) coordinates and a sample located at (W, −1−N) coordinates. Alternatively, the reference sample may include a sample located at (−1−N, H−N) coordinates and a sample located at (W−N, −1−N) coordinates. Alternatively, the reference sample may include a sample located at (−1−N, H+N) coordinates and a sample located at (W+N, −1−N) coordinates.

The decoding apparatus generates a prediction sample of the current block based on the reference sample (S1930). Alternatively, the decoding apparatus may directly use the prediction sample as a reconstructed sample according to the prediction mode. Also, the decoding apparatus may generate a predicted block of the current block based on the prediction sample. Also, the decoding apparatus may generate a reconstructed sample by adding a residual sample to the prediction sample. When there is a residual sample for the current block, the decoding apparatus may obtain information on the residual for the current block from the bitstream. The information on the residual may include transform coefficients on the residual sample. The decoding apparatus may derive the residual sample (or residual sample array) for the current block based on the residual information. The decoding apparatus may generate a reconstructed sample based on the prediction sample and the residual sample, and may derive a reconstructed block or a reconstructed picture based on the reconstructed sample. Thereafter, as described above, the decoding apparatus may apply an in-loop filtering procedure such as deblocking filtering and/or SAO procedure to the reconstructed picture in order to improve subjective/objective picture quality, if necessary.

In the above embodiment, the methods are described based on a flowchart as a series of steps or blocks, but this document is not limited to the order of the steps, and some steps may occur in a different order or concurrently with other steps as described above. In addition, those skilled in the art will understand that the steps shown in the flowchart are not exclusive and that other steps may be included or that one or more steps of the flowchart may be deleted without affecting the scope of this document.

The method according to this document described above may be implemented in the form of software, and the encoding apparatus and/or decoding apparatus according to this document may be included in, for example, a TV, a computer, a smart phone, a set-top box, a display device that performs image processing.

When the embodiments of the present document are implemented in software, the above-described method may be implemented by modules (processes, functions, and so on) that perform the functions described above. Such modules may be stored in memory and executed by a processor. The memory may be inside or outside the processor, and the memory may be connected to the processor using various well known means. The processor may include an application-specific integrated circuit (ASIC), other chipsets, a logic circuit, and/or a data processing device. The memory may include a read-only memory (ROM), a random access memory (RAM), a flash memory, a memory card, a storage medium, and/or other storage devices.

Figure 20:
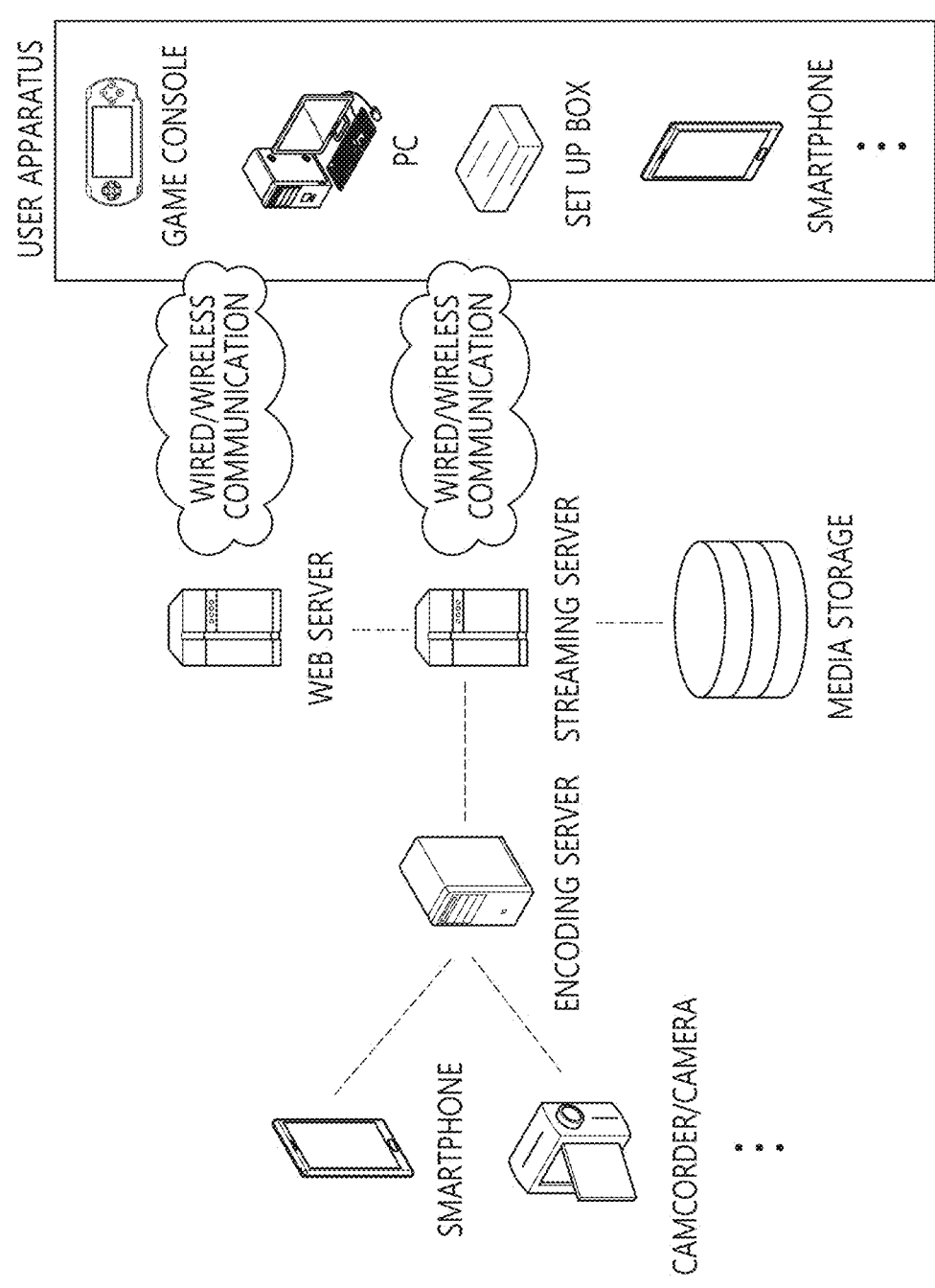
FIG. 20 is a diagram illustrating a structure of a content streaming system.

FIG. 20 is a diagram illustrating a structure of a content streaming system.

That is, the exemplary embodiments described in the present document may be performed by being implemented on a processor, a microprocessor, a controller, or a chip. For example, the functional units illustrated in each drawing may be performed by being implemented on a computer, a processor, a microprocessor, a controller, or a chip.

Further, the decoding apparatus and the encoding apparatus to which the present document is applied may be included in a multimedia broadcast transceiver, a mobile communication terminal, a home cinema video device, a digital cinema video device, a surveillance camera, a video chat device, a real-time communication device such as video communication, a mobile streaming device, a storage medium, a camcorder, a Video on Demand (VOD) service provider, an Over the top (OTT) video device, an Internet streaming service provider, a three-dimensional (3D) video device, a video call video device, a medical video device, or the like, and used for processing video signals or data signals. For example, the Over the top (OTT) video device may include a game console, a Blue-ray player, an Internet access TV, a home theater system, a smartphone, a tablet PC, a digital video recorder (DVR), and the like.

Further, the processing method to which the present document is applied may be produced in the form of a program executed by a computer, and stored in a computer-readable recording medium. The multimedia data having the data structure according to the present document may also be stored in the computer-readable recording medium. The computer-readable recording medium includes all kinds of storage devices and distribution storage devices in which the computer-readable data are stored. The computer-readable recording medium may include, for example, a Blue-ray disc (BD), a universal serial bus (USB), a ROM, a PROM, an EPROM, an EEPROM, a RAM, a CD-ROM, a magnetic tape, a floppy disc, and an optical data storage device. Further, the computer-readable recording medium includes a media implemented in the form of a carrier (e.g., transmission through the Internet). Further, the bitstream generated by the encoding method may be stored in the computer-readable recording medium or transmitted through a wired/wireless communication network. Further, the exemplary embodiment of the present document may be implemented by a computer program product by program codes, and the program codes may be performed by the computer according to the exemplary embodiment of the present document. The program codes may be stored on the computer-readable carrier.

Further, the content streaming system to which the present document is applied may largely include an encoding server, a streaming server, a web server, a media storage, a user device, and a multimedia input device.

The encoding server serves to compress the content input from the multimedia input devices such as a smartphone, a camera, and a camcorder into the digital data to generate a bitstream and transmit the bitstream to the streaming server. As another example, if the multimedia input devices such as a smartphone, a camera, and a camcorder directly generate the bitstream, the encoding server may be omitted. The bitstream may be generated by the encoding method to which the present document is applied or the bitstream generation method, and the streaming server may temporarily store the bitstream in the process of transmitting or receiving the bitstream.

The streaming server serves to transmit the multimedia data to the user device based on the user request through the web server, and the web server serves as a medium which informs the user of what services are available. When the user requests the desired service to the web server, the web server delivers the user's request to the streaming server, and the streaming server transmits the multimedia data to the user. At this time, the content streaming system may include a separate control server, and in this case, the control server serves to control commands/responses between the devices within the content streaming system.

The streaming server may receive the contents from the media storage and/or the encoding server. For example, when receiving the contents from the encoding server, the streaming server may receive the contents in real time. In this case, to provide the smooth streaming service, the streaming server may store the bitstream for a predetermined time.

As an example of the user device, there may be a portable phone, a smartphone, a laptop computer, a digital broadcast terminal, a personal digital assistants (PDA), a portable multimedia player (PMP), a navigation device, a slate PC, a tablet PC, an ultrabook, a wearable device (e.g., a smartwatch, a smart glass, a head mounted display (HMD)), a digital TV, a desktop computer, a digital signage, or the like. The respective servers within the content streaming system may be operated by a distribution server, and in this case, the data received by each server may be distributed and processed.

What is claimed is:

1. An image decoding method performed by a decoding apparatus, the method comprising:
   obtaining reference line index information and intra prediction mode information for a current block;
   determining an intra prediction mode of the current block based on the intra prediction mode information;
   deriving reference samples of the current block based on the reference line index information; and
   generating a prediction sample of the current block based on the intra prediction mode and the reference samples, wherein, based on the intra prediction mode being a DC mode and the current block being rectangular, first reference samples, among the reference samples, are used for the generating the prediction sample of the current block,
   wherein the first reference samples include only top neighboring samples or left neighboring samples of the current block,
   wherein the top neighboring samples are located in a row indicated by the reference line index information and a width of the top neighboring samples corresponds to a width of the current block,
   wherein the left neighboring samples are located in a column indicated by the reference line index information and a height of the left neighboring samples corresponds to a height of the current block, and
   wherein a value of the reference line index information is greater than 0.

2. The image decoding method of claim 1,
   wherein the top neighboring samples are located at coordinates from $(0, -1-N)$ to $(W-1, -1-N)$ and the left neighboring samples are located at coordinates from $(-1-N, 0)$ to $(-1-N, H-1)$ based on a coordinate $(0, 0)$ of a top-left sample position of the current block,
   wherein the N represents the value of the reference line index information, the W represents the width of the current block, and the H represents the height of the current block.

3. An image encoding method performed by an encoding apparatus, the method comprising:
   deriving reference samples of a current block and an intra prediction mode of the current block;
   generating a prediction sample of the current block based on the intra prediction mode and the reference samples;
   generating reference line index information based on the reference samples;
   generating intra prediction mode information based on the intra prediction mode; and
   encoding image information including the reference line index information and the intra prediction mode information to generate a bitstream,
   wherein, based on the intra prediction mode being a DC mode and the current block being rectangular, first reference samples, among the reference samples, are used for the generating the prediction sample of the current block,
   wherein the first reference samples include only top neighboring samples or left neighboring samples of the current block,
   wherein the top neighboring samples are located in a row indicated by the reference line index information and a width of the top neighboring samples corresponds to a width of the current block,
   wherein the left neighboring samples are located in a column indicated by the reference line index information and a height of the left neighboring samples corresponds to a height of the current block, and
   wherein a value of the reference line index information is greater than 0.

4. The image encoding method of claim 3,
   wherein the top neighboring samples are located at coordinates from $(0, -1-N)$ to $(W-1, -1-N)$ and the left neighboring samples are located at coordinates from $(-1-N, 0)$ to $(-1-N, H-1)$ based on a coordinate $(0, 0)$ of a top-left sample position of the current block, and wherein the N represents the value of the reference line index information, the W represents the width of the current block, and the H represents the height of the current block.

5. A transmission method of data for an image, the method comprising:

obtaining a bitstream of the image, wherein the bitstream is generated based on deriving reference samples of a current block and an intra prediction mode of the current block, generating a prediction sample of the current block based on the intra prediction mode and the reference samples, generating reference line index information based on the reference samples, generating intra prediction mode information based on the intra prediction mode, and generating the bitstream by encoding image information including the reference line index information and the intra prediction mode information; and transmitting the data comprising the bitstream, wherein, based on the intra prediction mode being a DC mode and the current block being rectangular, first reference samples, among the reference samples, are used for the generating the prediction sample of the current block, wherein the first reference samples include only top neighboring samples or left neighboring samples of the current block, wherein the top neighboring samples are located in a row indicated by the reference line index information and a width of the top neighboring samples corresponds to a width of the current block, wherein the left neighboring samples are located in a column indicated by the reference line index information and a height of the left neighboring samples corresponds to a height of the current block, and wherein a value of the reference line index information is greater than 0.

6. The transmission method of claim 5, wherein the top neighboring samples are located at coordinates from $(0, -1-N)$ to $(W-1, -1-N)$ and the left neighboring samples are located at coordinates from $(-1-N, 0)$ to $(-1-N, H-1)$ based on a coordinate $(0, 0)$ of a top-left sample position of the current block, and wherein the N represents the value of the reference line index information, the W represents the width of the current block, and the H represents the height of the current block.

* * * * *